United States Patent
Oomori et al.

(10) Patent No.: US 12,161,247 B2
(45) Date of Patent: Dec. 10, 2024

(54) EXTRACTION BAG

(71) Applicant: OHKI CO., LTD., Osaka (JP)

(72) Inventors: Shigeki Oomori, Chiba (JP); Yumiko Abe, Tokyo (JP); Mamoru Uchihara, Narashino (JP); Mitsunori Saitoh, Takatsuki (JP)

(73) Assignee: OHKI CO., LTD., Osaka (JP)

( * ) Notice: Subject to any disclaimer, the term of this patent is extended or adjusted under 35 U.S.C. 154(b) by 500 days.

(21) Appl. No.: 17/601,444

(22) PCT Filed: Aug. 25, 2020

(86) PCT No.: PCT/JP2020/031950
§ 371 (c)(1),
(2) Date: Oct. 5, 2021

(87) PCT Pub. No.: WO2021/044897
PCT Pub. Date: Mar. 11, 2021

(65) Prior Publication Data
US 2022/0192411 A1 Jun. 23, 2022

(30) Foreign Application Priority Data
Sep. 3, 2019 (JP) ................. 2019-160052

(51) Int. Cl.
*A47J 31/06* (2006.01)
*B65D 85/808* (2006.01)

(52) U.S. Cl.
CPC ....... *A47J 31/0615* (2013.01); *A47J 31/0631* (2013.01); *B65D 85/808* (2013.01)

(58) Field of Classification Search
CPC . A47J 31/0631; A47J 31/0615; B65D 85/808; B65D 85/812
See application file for complete search history.

(56) References Cited

U.S. PATENT DOCUMENTS

| | | | | |
|---|---|---|---|---|
| 3,895,118 | A | * 7/1975 | Rambold | B65D 85/812 206/0.5 |
| 2012/0000369 | A1 | * 1/2012 | Saitoh | A47J 31/02 99/279 |
| 2017/0319004 | A1 | 11/2017 | Magner | |

FOREIGN PATENT DOCUMENTS

| CN | 104334060 A | 2/2015 |
|---|---|---|
| JP | S49-44865 A | 4/1974 |

(Continued)

OTHER PUBLICATIONS

Jan. 23, 2024 Office Action issued in Brazilian Patent Application No. BR112021018705-7.

(Continued)

*Primary Examiner* — Walter D. Griffin
*Assistant Examiner* — Cameron J Allen
(74) *Attorney, Agent, or Firm* — Oliff PLC

(57) ABSTRACT

A tea bag type extraction bag to obtain extraction liquid includes bag main body formed of water permeable filter sheet, pair of thin plate-like members provided on outer surfaces of two opposing faces of bag main body; and extraction material filled in bag main body. Respective outer surfaces of bag main body, thin plate-like member includes upper edge portion attached to upper part of bag main body, gripping portion continuous with upper edge portion via fold line and extends from fold line toward lower edge of bag main body, and leg portion extending from upper edge of bag main body toward lower edge of bag main body. Upper edge of upper edge portion is flush with upper edge of bag main body, and gripping portion is able to be folded upward along fold line so that leading end part thereof projects from upper edge of bag main body.

6 Claims, 30 Drawing Sheets

(56) References Cited

FOREIGN PATENT DOCUMENTS

| JP | H04-352655 | A | | 12/1992 |
|---|---|---|---|---|
| JP | H08-508660 | A | | 9/1996 |
| JP | H10194337 | A | * | 7/1998 |
| JP | 2002-526339 | A | | 8/2002 |
| JP | 2005-118239 | A | | 5/2005 |
| JP | 2006-273379 | A | | 10/2006 |
| JP | 3140084 | U | | 3/2008 |
| JP | 2008-081205 | A | | 4/2008 |
| JP | 2012-187278 | A | | 10/2012 |

OTHER PUBLICATIONS

Sep. 29, 2020 International Search Report issued in International Patent Application No. PCT/JP2020/031950.
Mar. 8, 2022 International Preliminary Report on Patentability issued in International Patent Application No. PCT/JP2020/031950.
Mar. 23, 2023 Office Action issued in Taiwanese Patent Application No. 109129011.
Dec. 16, 2022 Office Action issued in Chinese Patent Application No. 202080029901.7.
Oct. 11, 2023 extended Search Report issued in European Patent Application No. 20860802.6.

* cited by examiner

EXTRACTION BAG

TECHNICAL FIELD

The present invention relates to an extraction bag to obtain extraction liquid by making an extraction material filled in a bag main body, made of a water permeable filter sheet, immersed into hot water.

BACKGROUND ART

To brew beverages such as green tea, black tea, and oolong tea easily, tea bags having water-permeable bag main bodies with strings in which such tea leaves are filled have been conventionally used widely. With regard to coffee as well, tea bag type coffee extraction bags according to which bag main bodies filled with ground coffee are immersed into hot water have been used in addition to drip type extraction bags according to which hot water is poured onto ground coffee. When it is attempted to immerse such a tea bag type coffee extraction bag into hot water, however, the bag main body filled with ground coffee is more likely to float in the hot water due to carbon dioxide contained in the ground coffee, thus making it difficult to extract coffee sufficiently. In view of this, an extraction bag has been proposed which includes a hooking piece formed of a thin plate-like member and attached to one outer surface of a bag main body filled with ground coffee so that the hooking piece can be hooked onto the rim of a cup to prevent the floating of the bag main body filled with the ground coffee in hot water (Patent Literature 1).

It has been also proposed that handle portions having a structure to expand and contract like a pantograph by folding thin plate-like members are attached to a bag main body filled with ground coffee, and the extraction of coffee is facilitated by moving the handle portions up and down in hot water in which the bag main body is immersed (Patent Literature 2).

CITATION LIST

Patent Literature

Patent Literature 1: Japanese Utility Model Registration No. 3140084
Patent Literature 2: Japanese Patent Application Laid-Open No. 2006-273379

SUMMARY OF INVENTION

Technical Problem

For such a conventional coffee extraction bag according to which the bag main body filled with ground coffee is immersed into hot water, however, even when floating bag main body is forcibly sunk into hot water, only a surface layer of the entire ground coffee filled in the bag main body swells by the hot water and the hot water is less likely to permeate into the inside of the entire ground coffee. Thus, it takes time to extract coffee. Even when the bag main body filled with the ground coffee is moved up and down in the hot water in order to facilitate the extraction of coffee, no sufficient amount of hot water runs through the bag main body and hot water only flows along the surface of the entire ground coffee filled in the bag main body. Thus, it is difficult to make the entire ground coffee swelled and thus to extract coffee liquid with sufficient concentration.

In contrast to this, an object of the present invention is to provide a tea bag type extraction bag to obtain extraction liquid by making a bag main body filled with an extraction material, such as ground coffee, immersed into hot water, capable of allowing the hot water to run through the entire extraction material in the bag main body thoroughly and thereby obtaining extraction liquid with sufficient concentration easily.

Solution to Problem

The present inventor has conceived that in a tea bag type extraction bag in which thin plate-like members are attached to a bag main body filled with an extraction material, the thin plate-like members formed to have a particular shape can ensure a sufficient head space in the bag main body when the bag main body is immersed into hot water, and therefore the hot water flows downward with respect to an upper surface of the extraction material in the bag main body upon moving up and down the bag main body in the hot water, so that the hot water is more likely to permeate into the inside of the extraction material. As a result, the present inventor has completed the present invention.

Specifically, the present invention provides an extraction bag including: a bag main body formed of a water permeable filter sheet;
a pair of thin plate-like members provided on outer surfaces of two opposing faces of the bag main body; and
an extraction material filled in the bag main body, in which
on each of the outer surfaces, the thin plate-like member includes an upper edge portion attached to an upper part of the bag main body,
a gripping portion continuous with the upper edge portion via a fold line and extending from the fold line toward a lower edge of the bag main body, and
a leg portion extending from an upper edge of the bag main body toward the lower edge of the bag main body,
an upper edge of the upper edge portion is flush with the upper edge of the bag main body, and
the gripping portion is able to be folded upward along the fold line so that a leading end part of the gripping portion projects from the upper edge of the bag main body.

ADVANTAGEOUS EFFECTS OF INVENTION

According to the present invention, the thin plate-like member is provided on each surface of the two opposing faces of the bag main body filled with the extraction material, and the pair of thin plate-like members each include the upper edge portion provided in the upper part of the bag main body, the gripping portion continuous with the upper edge portion and capable of being folded upward, and the leg portion extending from the upper edge of the bag main body toward the lower edge of the bag main body. Thus, the gripping portions are folded upward and gripped to push the bag main body into hot water in a cup, and thus the entire bag main body can be easily immersed into the hot water. In addition, by moving the bag main body up and down in the hot water, a speed at which the hot water permeates into the extraction material in the bag main body can be increased. Furthermore, according to the present invention, the upper edges of the upper edge portions in the pair of thin plate-like members are attached so as to be flush with the upper edge of the bag main body. Thus, if the leg portions in the pair of thin plate-like members hit the bottom of a cup when the bag main body is pushed into hot water in the cup, pushing force at the time of pushing the bag main body is evenly applied to the leg portions in the pair of thin plate-like members, but the leg portions stand firm against the pushing force. Consequently, the middle part of the bag main body is expanded. In this case, the middle part of the bag main body expands without the bag main body being curved or bent toward only one of the outer surfaces of the two opposing faces thereof, thus forming a large head space above the extraction material in the bag main body. Consequently, hot water enters into the head space, and the hot water flows downward from the upper surface of the extraction material in the bag main body. Thus, by moving the bag main body up and down, the hot water not only flows along the surface of the extraction material filled in the bag main body but also permeates into the inside of the extraction material. This makes the entire extraction material swelled, and thus extraction liquid can be obtained from the entire extraction material. Thus, it becomes possible to obtain extraction liquid with sufficient concentration within a short amount of time.

DESCRIPTION OF EMBODIMENTS

Figure 1A:
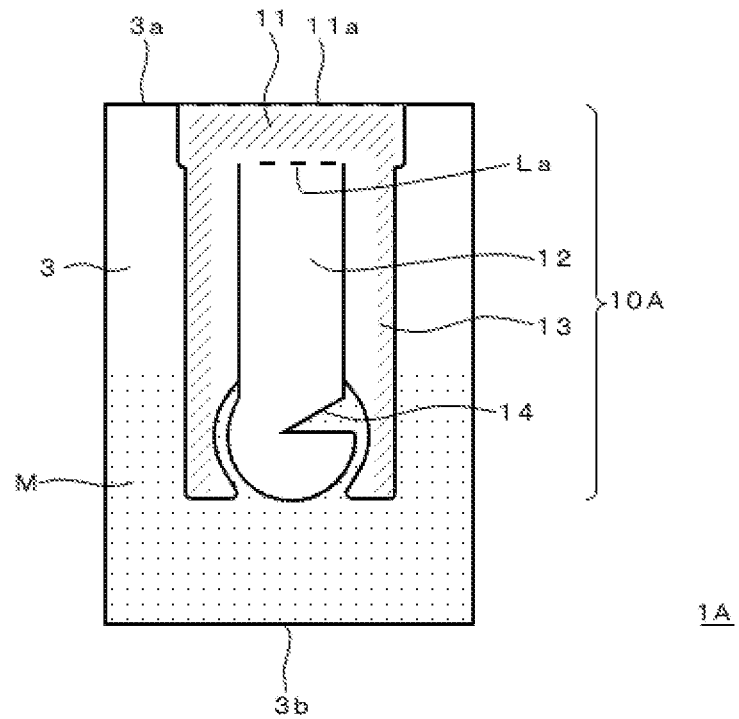
FIG. 1A is a front view illustrating an extraction bag 1A according to an embodiment in a state in which gripping portions are not folded upward.

The present invention will be described specifically below with reference to the drawings. Note that the same reference numerals in the figures denote the identical or equivalent elements.

Figure 1B:
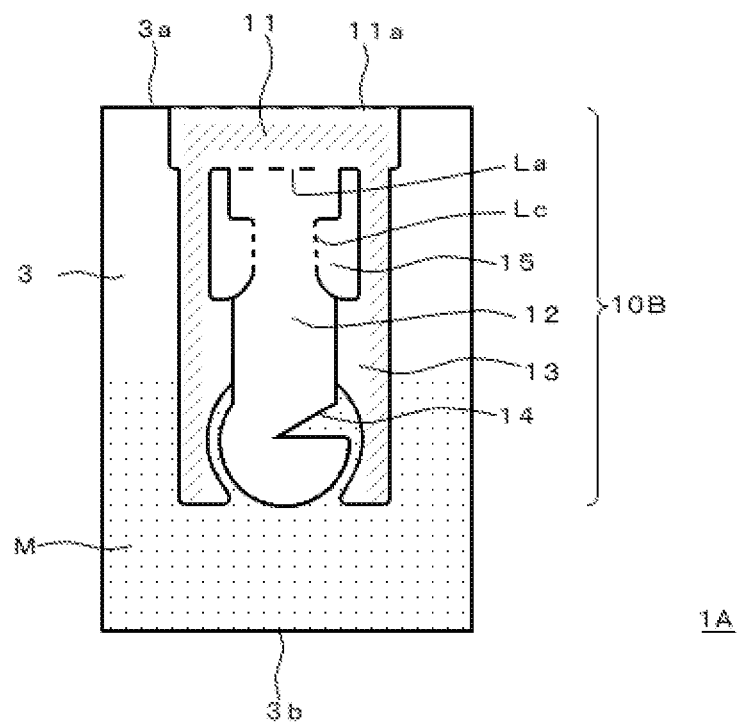
FIG. 1B is a rear view illustrating the extraction bag 1A according to the embodiment in a state in which the gripping portions are not folded upward.
Figure 1C:
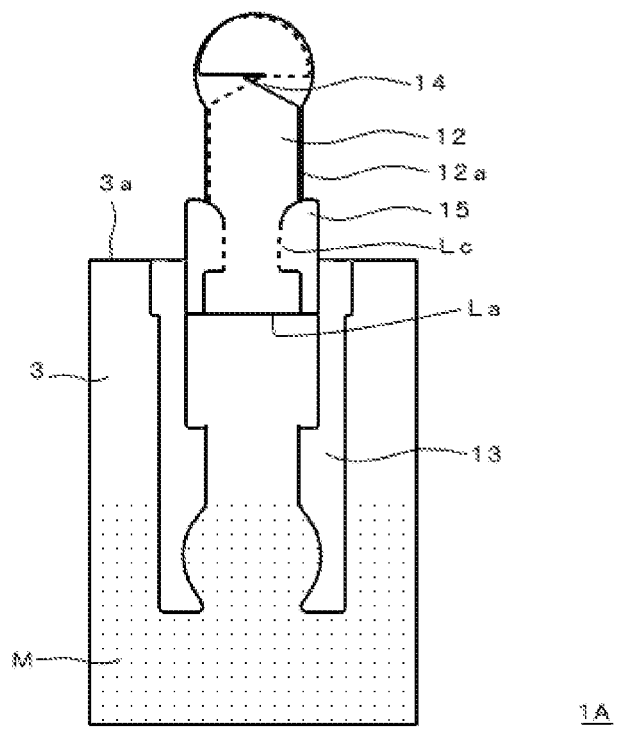
FIG. 1C is a rear view of the extraction bag 1A according to the embodiment in a state in which the pair of gripping portions are folded upward and engaged with each other.
Figure 1D:
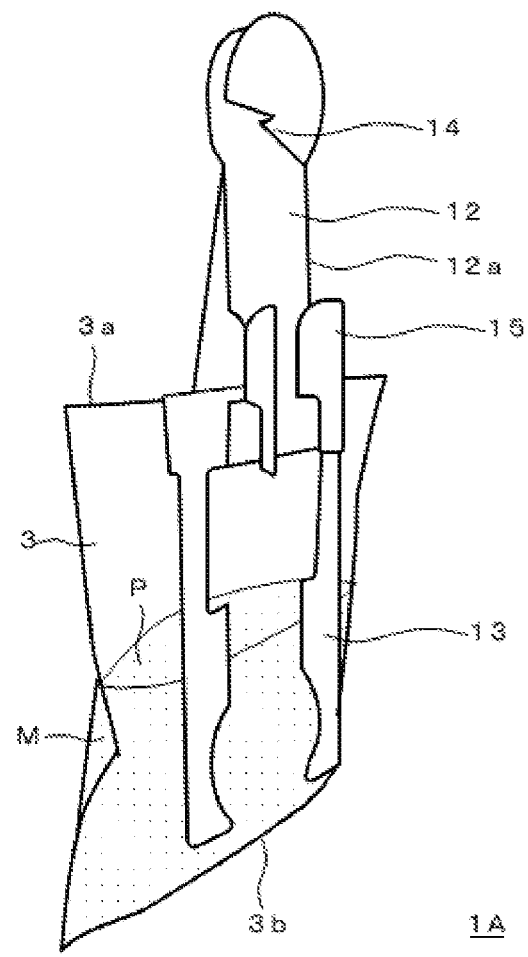
FIG. 1D is a perspective view illustrating the extraction bag 1A according to the embodiment in a state in which the gripping portions are folded upward and engaged with each other and hooking portions are made projected from the gripping portion.
Figure 2:
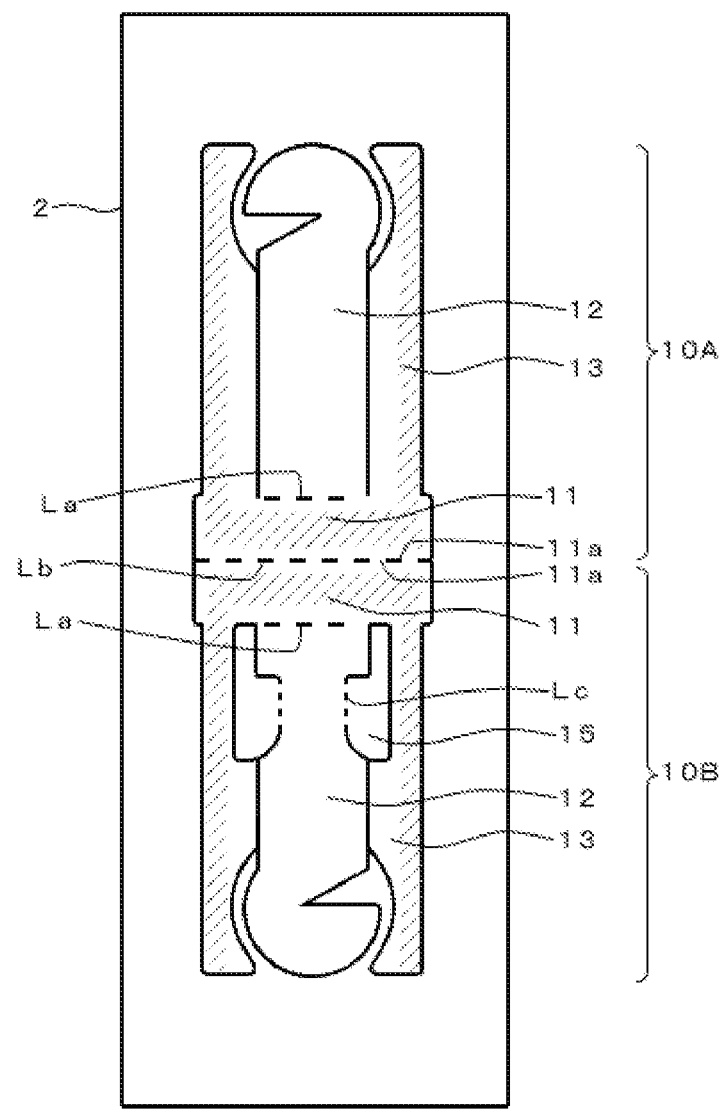
FIG. 2 is a developed view of a bag main body including thin plate-like members in the extraction bag 1A according to the embodiment.

General Configuration:

FIGS. 1A and 1B are a front view and a rear view, respectively, illustrating an extraction bag 1A according to an embodiment of the present invention in a state in which gripping portions 12 are not folded upward. FIG. 1C is a rear view of the extraction bag 1A in a state in which the gripping portions 12 are folded upward and engaged with each other. FIG. 1D is a perspective view illustrating the extraction bag 1A in a state in which the gripping portions 12 are folded upward and engaged with each other and hooking portions 15 are made projected. FIG. 2 is a developed view of a bag main body 3 including thin plate-like members in the extraction bag 1A.

The extraction bag 1A is a tea bag type extraction bag to obtain extraction liquid by making the bag main body, filled with an extraction material, immersed into hot water. As shown in FIGS. 1A to 1D and 2, the extraction bag 1A is an extraction bag for extracting a beverage, including: the bag main body 3 in the shape of a flat bag, formed of a water permeable filter sheet 2; a pair of thin plate-like members 10A and 10B provided on outer surfaces of two opposing faces of the bag main body 3; and an extraction material M filled in the bag main body 3. In FIGS. 1A to 1D, a region filled with dots in the bag main body 3 represents a region in which the extraction material M is filled, and a region filled with oblique lines represents a bonded region between the thin plate-like member 10A or 10B and the water permeable filter sheet 2.

The pair of thin plate-like members 10A and 10B each include an upper edge portion 11, the gripping portion 12, and leg portions 13.

In each of the thin plate-like members 10A and 10B, the upper edge portion 11 is attached to an upper part of the bag main body 3. An upper edge 11a of the upper edge portion 11 is flush with an upper edge 3a of the bag main body 3, and this respect constitutes one of major configurations of the present invention. In other words, the upper edge 11a of the upper edge portion 11 in the thin plate-like member 10A on one outer surface of the bag main body 3 is formed to be in a state of being in contact with the upper edge 11a of the upper edge portion 11 in the thin plate-like member 10B on the other outer surface of the bag main body 3. In the present embodiment, the upper edge 11a of the upper edge portion 11 in the thin plate-like member 10A on one outer surface of the bag main body 3 is made continuous with the upper edge 11a of the upper edge portion 11 in the thin plate-like member 10B on the other outer surface of the bag main body 3 via a fold line Lb (FIG. 2). The fold line Lb is overlapped with the upper edge 3a of the bag main body 3, which corresponds to a mountain fold of the water permeable filter sheet 2, so that the upper edge 11a of the upper edge portion 11 is flush with the upper edge 3a of the bag main body 3. In this manner, the upper edges 11a of the upper edge portions 11 in the pair of thin plate-like members 10A and 10B are made in contact with each other.

The fold line as used in the present invention refers to a line formed to fold the thin plate-like member, and such a fold line can be formed by means of perforation, half-cutting, scoring, and the like. Thus, even when the above-described fold line Lb is solely constituted of a cut line and the upper edges 11a of the pair of upper edge portions 11 are thereby separated from each other, the cut line is included in the scope of the fold line as used herein if the upper edges 11a of the pair of upper edge portions 11 can maintain a state of being in contact with each other as a result of the upper edges 11a of the separated pair of upper edge portions 11 being bonded to the underlying water permeable filter sheet 2.

By making the upper edge 11a of the upper edge portion 11 in the thin plate-like member 10A on one outer surface of the bag main body 3 in contact with the upper edge 11a of the upper edge portion 11 in the thin plate-like member 10B on the other outer surface of the bag main body 3, the bag main body 3 can be pushed into hot water without being curved or bent toward only one of the outer surfaces of the opposing faces thereof and a middle part of the bag main body 3 can be expanded by increasing a distance between the two opposing faces of the bag main body 3 (FIG. 4A) when the gripping portions 12 are folded upward as will be described later and gripped to immerse the bag main body 3 into the hot water in a cup. Moreover, positional misalignment between the pair of upper edge portions 11 to be made in contact with each other can be prevented from occurring in the production of an extraction bag production sheet 20 (FIG. 5) used for producing the extraction bags 1A.

The gripping portion 12 is continuous with the upper edge portion 11 via a fold line La, and extends from the fold line La toward a lower edge 3b of the bag main body 3 (FIGS. 1A and 1B). The gripping portion 12 can be folded upward along the fold line La, and a leading end part of the gripping portion 12 in a state of being folded upward projects from the upper edge 3a of the bag main body 3 (FIGS. 1C and 1D). The upper edge portion 11 and the leg portion 13, on the other hand, cannot be pulled out from the bag main body 3.

End parts of the gripping portions 12 of the pair of thin plate-like members 10A and 10B are provided with engagement portions 14 to make the pair of gripping portions 12 that are folded upward engaged with each other. A notch, such as a V-shaped notch or an I-shaped notch, can be formed as the engagement portion 14. This makes it easier to grip the gripping portions 12 folded upward. Also, the gripping portions 12 folded upward can be formed into a rigid single rod shape. Thus, it becomes easier to push the bag main body 3 into hot water while gripping the gripping portions 12 so that the bag main body 3 is immersed in the hot water.

In the end part of the gripping portion 12 where the engagement portion 14 is formed, such an end part and the leg portions 13 are spaced apart from each other by notches formed therebetween. Such notches indicate that the end parts of the gripping portions 12 are parts to be gripped.

The hooking portions 15 by which the gripping portion 12 in a state of being folded upward can be hooked onto an opening wall of a cup are formed in lateral parts of the gripping portion 12 in the thin plate-like member 10B, one of the thin plate-like members 10A and 10B provided on the outer surfaces of the two opposing faces of the bag main body 3. More specifically, the gripping portion 12 in the one thin plate-like member 10B includes notches and fold lines Lc formed so that the hooking portions 15 of an inverted L-shaped hook type can be pulled out from the lateral parts of the gripping portion 12. In the present embodiment, in particular, the hooking portion 15 is partially projected from a lateral edge 12a of the gripping portion 12 (FIG. 1C). Thus, the hooking portion 15 can be easily pulled out from the surface of the gripping portion 12 by hooking fingers to the projected portion of the hooking portion 15 after the gripping portion 12 is folded upward and folding the hooking portion 15 along the fold line Lc (FIG. 1D).

The hooking portions 15 are provided as necessary in the present invention. With the provision of the hooking portions 15, extraction can be facilitated while suppressing the floating of the bag main body 3 and one can keep hands off the extraction bag 1A during an extraction operation by immersing the bag main body 3 into hot water in a cup and making the extraction bag hooked onto the cup. Moreover, one can drink the extraction liquid from the cup with the extraction bag being hooked onto the cup.

The leg portions 13 extend from the upper edge 3a of the bag main body 3 toward the lower edge 3b of the bag main body 3. In the present embodiment, upper parts of the leg portions 13 are continuous with the upper edge portion 11, and no fold lines, no notches, or the like are formed therebetween. The leg portions 13 are formed in such a manner as to extend the upper edge portion 11 downward. Thus, the upper edges of the leg portions 13 are also flush with the upper edge 3a of the bag main body 3 as with the upper edge 11a of the upper edge portion 11.

In the present embodiment, the leg portions 13 are provided on both sides of the gripping portion 12. Positions of the lower ends of the leg portions 13 in the pair of thin plate-like members 10A and 10B are placed at the same distance from the upper edge 3a of the bag main body 3. The leg portions 13 extend long from the upper edge 3a of the bag main body 3 toward the lower edge 3b of the bag main body 3 so that their positions of the lower ends come closer to the lower edge 3b of the bag main body 3 than an upper surface P (FIG. 1D) of the extraction material M when the bag main body 3 is hung with the upper edge 3a of the bag main body 3 facing upward. This facilitates the pushing of the bag main body 3 when the bag main body 3 is pushed into hot water while gripping the gripping portions 12. Moreover, the middle part of the bag main body 3 can be expanded by increasing a distance between the two opposing faces of the bag main body 3 without the bag main body 3 being curved or bent toward only one of the outer surfaces of the opposing faces thereof.

Extraction Material:

Examples of the extraction material to be filled in the bag main body 3 include ground coffee, tea leaves such as black tea or green tea, and Chinese herbs. In general, when ground coffee is filled in the bag main body 3 and it is attempted to immerse such a bag main body 3 into hot water, the bag main body is more likely to float due to carbon dioxide contained in the ground coffee, thus making the extraction difficult. According to the present invention, however, the bag main body 3 can be forcibly immersed into hot water in a cup in an easy manner while gripping the gripping portions 12. Furthermore, by moving the bag main body 3 up and down in the hot water, the hot water permeates into not only a surface layer of the entire ground coffee in the bag main body but also the inside of the entire ground coffee. Thus, extraction liquid can be obtained efficiently from the entire ground coffee.

Note that the extraction bag of the present invention is used with the extraction material in a state of being sealed in the bag main body 3, and thus the extraction material is prevented from spreading into the outside of the bag main body during the use of the extraction bag.

Bag Main Body:

The shape of the bag main body 3 in the present embodiment is a flat bag having an upper edge corresponding to a mountain fold and three sealed edges. The shape of the bag main body 3 in the present invention is not limited to a flat bag. For example, the bag main body 3 may be a gusset bag having a gusset in a bottom part or a side part thereof.

Net flat dimensions of the bag main body 3 can be appropriately set in accordance with the size of a cup or a container used when extraction liquid is obtained by using the extraction bag. For example, the bag main body 3 can be made to have a size suitable for commercially available coffee cups.

Water Permeable Filter Sheet:

Various sheets having a water permeable property and a filterable property so as to be used for extracting an extraction material can be used as a water permeable filter sheet used for forming the bag main body. Constituent materials of the water permeable filter sheet can be appropriately selected depending on a kind of the extraction material. In general, woven fabric or non-woven fabric made of single or composite fiber of synthetic fiber such as polyester, nylon, polyethylene, polypropylene, or vinylon, semi-synthetic fiber such as rayon, or natural fiber such as Broussonetia or Edgeworthia; mixed paper made of, for example, Manila hemp, wood pulp, or polypropylene fiber; and paper such as tea bag paper base have been known as water permeable filter sheets to extract beverages. These can be used also in the present invention. From the standpoint of disposability after the use of the extraction bag, it is preferable that the water permeable filter sheet contain biodegradable fiber. Examples of such biodegradable fiber include polylactic acid, polybutylene succinate, and polyethylene succinate. From the standpoint of imparting transparency to the water permeable filter sheet in order to see the state of the extraction material in the bag main body, it is preferable that the content of an inorganic pigment be reduced or no inorganic pigment be contained.

Thin Plate-Like Member:

Preferable thin plate-like members are those having water repellency. Such a thin plate-like member is formed by punching out a thin plate-like material such as paper board having a surface laminated with a resin, or a plastic sheet.

Figure 3:
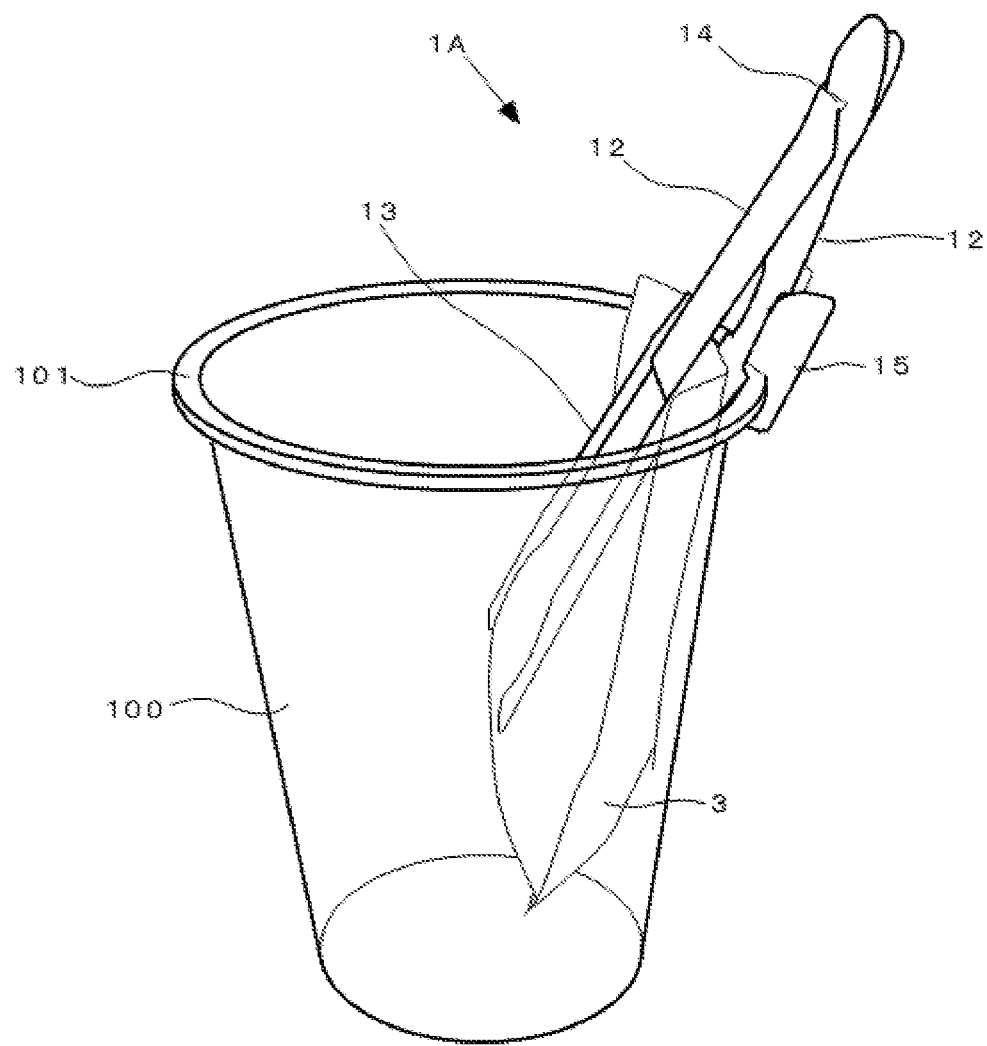
FIG. 3 is a perspective view illustrating a state in which the extraction bag 1A according to the embodiment is hooked onto a cup.

Method of Use:

A preferable packaging form of the extraction bag 1A is a state in which the entire thin plate-like members 10A and 10B are on the surfaces of the bag main body 3 as shown in FIGS. 1A and 1B. Thus, as the method of use starting from such a state, the gripping portions 12 on both outer surfaces of the bag main body 3 are first folded upward along the fold lines La, and the engagement portions 14 of the gripping portions 12 folded upward are engaged with each other as shown in FIG. 1C. Subsequently, the hooking portions 15 provided in the gripping portion 12 are folded along the fold lines Lc so as to be pulled out from the surface of the gripping portion 12 (FIG. 1D). The hooking portions 15 are then hooked onto an opening wall 101 of a cup 100 (FIG. 3), and hot water is poured into the cup. Since the floating of the bag main body 3 can be suppressed by making the hooking portions 15 hooked onto the cup 100, the hot water permeates into the extraction material even just by making the extraction bag 1A hooked onto the cup 100.

Figure 4A:
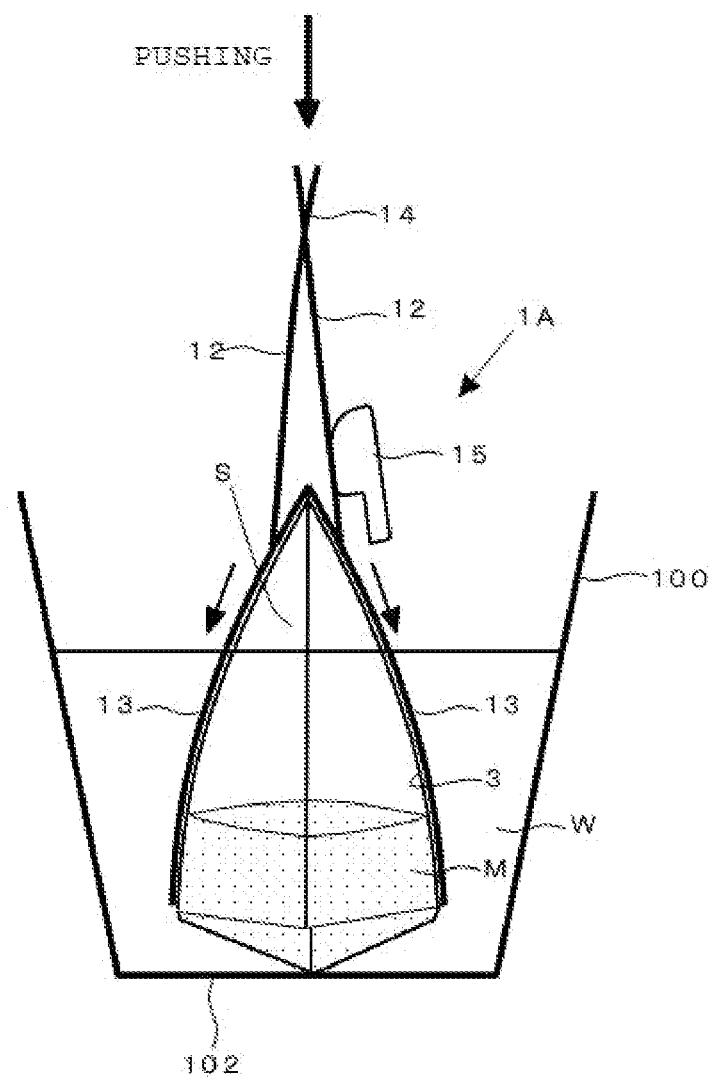
FIG. 4A is a side view illustrating a state in which the extraction bag 1A according to the embodiment is being pushed into hot water in a cup.
Figure 4B:
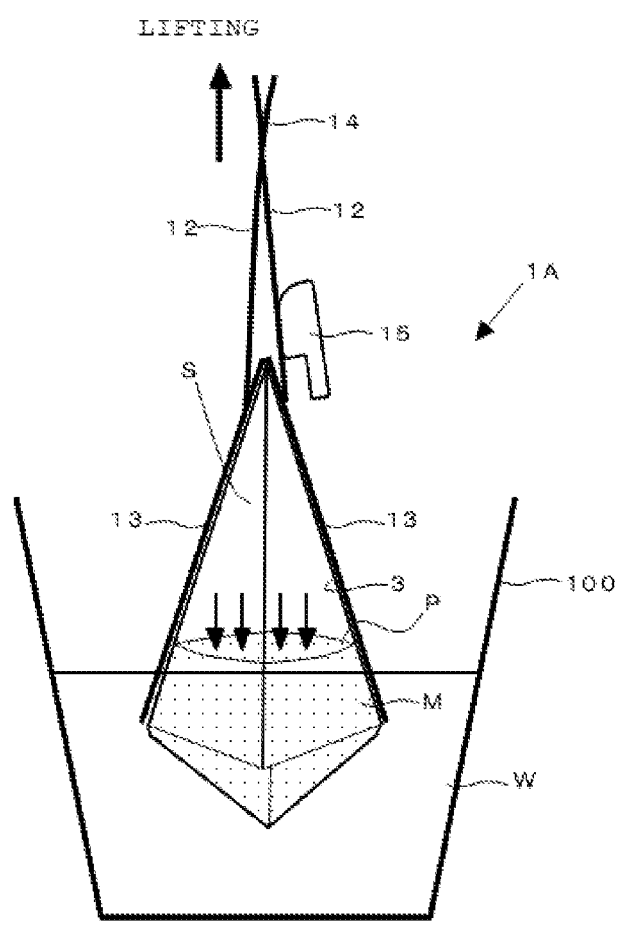
FIG. 4B is a side view illustrating a state in which the extraction bag 1A according to the embodiment is being lifted from the hot water in the cup.

When the extraction material is ground coffee, however, extraction liquid can be easily obtained from the surface layer of the entire ground coffee in the bag main body 3, but the hot water is less likely to permeate into the inside of the entire ground coffee if the bag main body 3 is just immersed in the hot water. In view of this, the gripping portions 12 are gripped to repeat a pushing motion in which the bag main body 3 is pushed into the hot water W in the cup 100 as shown in FIG. 4A and a lifting motion in which the bag main body 3 is lifted as shown in FIG. 4B in order to facilitate extraction from the entire ground coffee. At this time, since the leg portions 13 are provided on the outer surfaces of the two opposing faces of the bag main body 3 and the lower ends of the leg portions 13 are preferably located closer to the lower edge of the bag main body 3 than the upper surface P of the extraction material M in the bag main body 3, the entire bag main body 3 can be easily immersed into the hot water. Moreover, the bag main body 3 is allowed to hit a bottom 102 of the cup 100 as shown in FIG. 4A. Even when the bag main body 3 hits the bottom 102 of the cup 100, the force to push in the bag main body 3 is evenly transferred from the gripping portions 12 to the pair of leg portions 13 on both outer surfaces of the bag main body 3 and the pair of leg portions 13 are equally spread and stand firm. Thus, the middle part of the bag main body is expanded without the bag main body 3 being curved or bent toward only one of the outer surfaces of the opposing faces thereof, thereby increasing a head space S in the bag main body 3. Subsequently, when the bag main body 3 is lifted from the hot water W while gripping the gripping portions 12, the hot water entered into the head space S flows downward toward the surface of the extraction material M in the bag main body 3 as indicated by downward arrows in FIG. 4B. Consequently, even when the extraction material M is ground coffee, the hot water permeates into not only the surface layer of the entire ground coffee in the bag main body 3 but also the inside thereof. Thus, by repeating such pushing and lifting motions, the entire ground coffee in the bag main body 3 can be forcibly made in contact with the hot water within a short amount of time. Consequently, extraction liquid can be obtained speedily from the entire extraction material even when the extraction material is ground coffee. This can be confirmed by a fact that the concentration of extraction liquid increases every time the pushing and lifting motions are repeated.

Figure 15A:
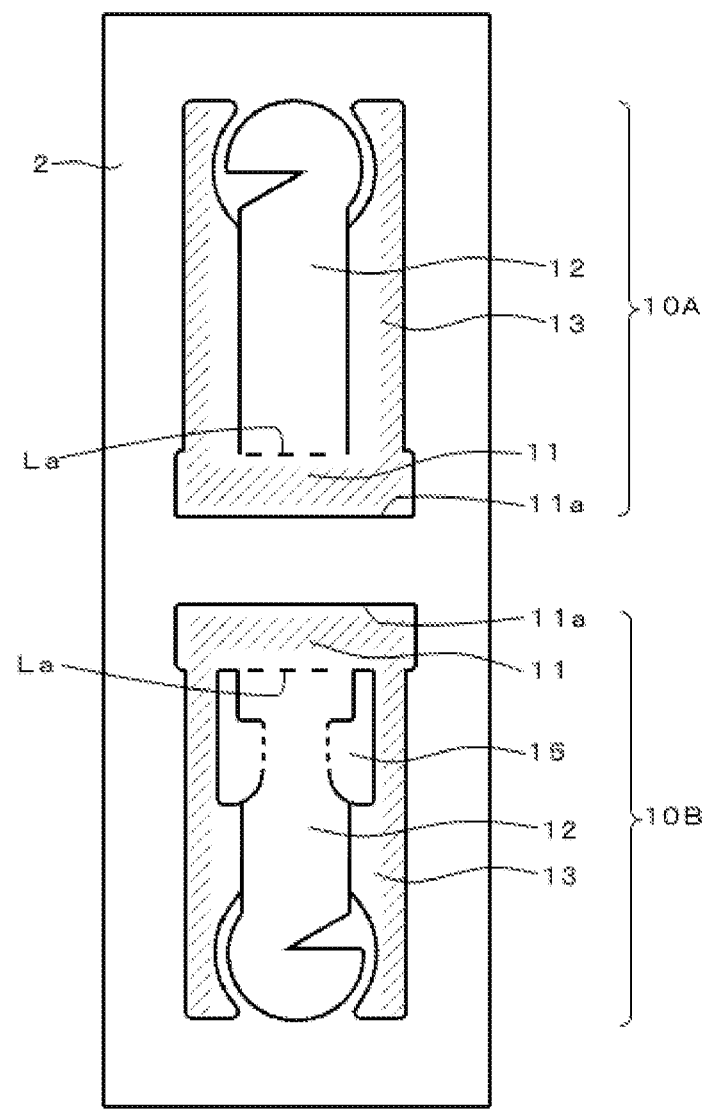
FIG. 15A is a developed view of a bag main body including thin plate-like members in an extraction bag 1X according to a comparative example.
Figure 15B:
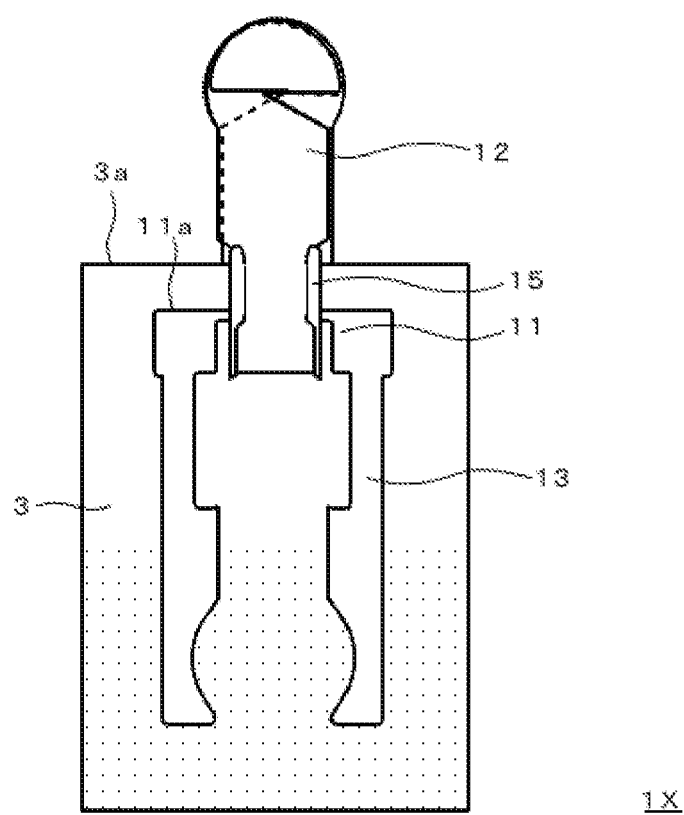
FIG. 15B is a rear view illustrating the extraction bag 1X according to the comparative example in a state in which a pair of gripping portions are folded upward and engaged with each other and hooking portions are pulled out.
Figure 15C:
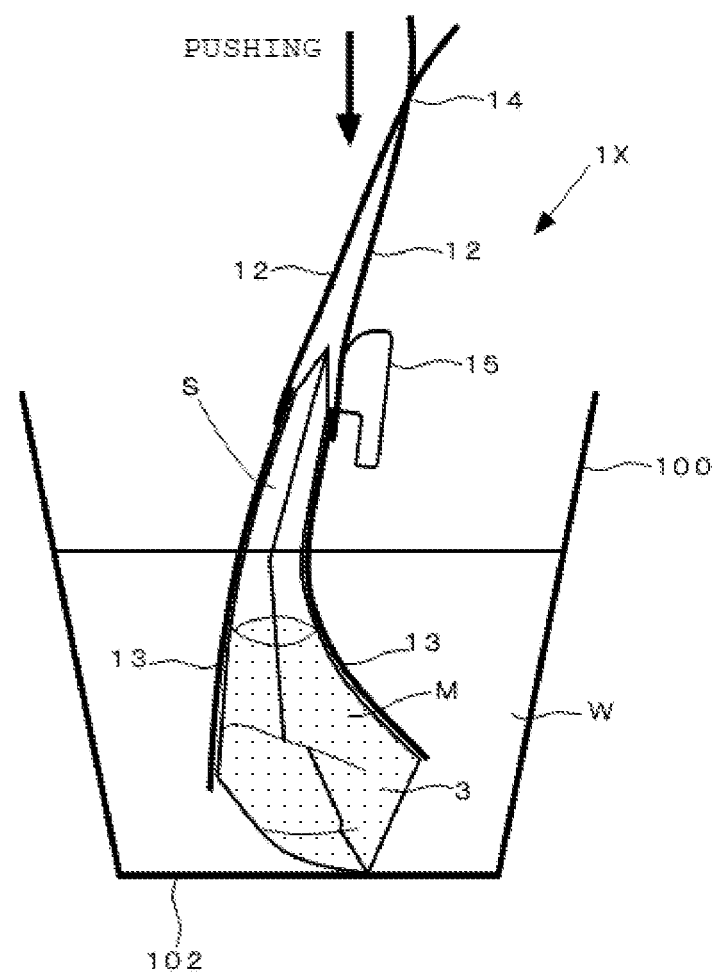
FIG. 15C is a side view illustrating a state in which the extraction bag 1X according to the comparative example is being pushed into hot water in a cup.
Figure 15D:
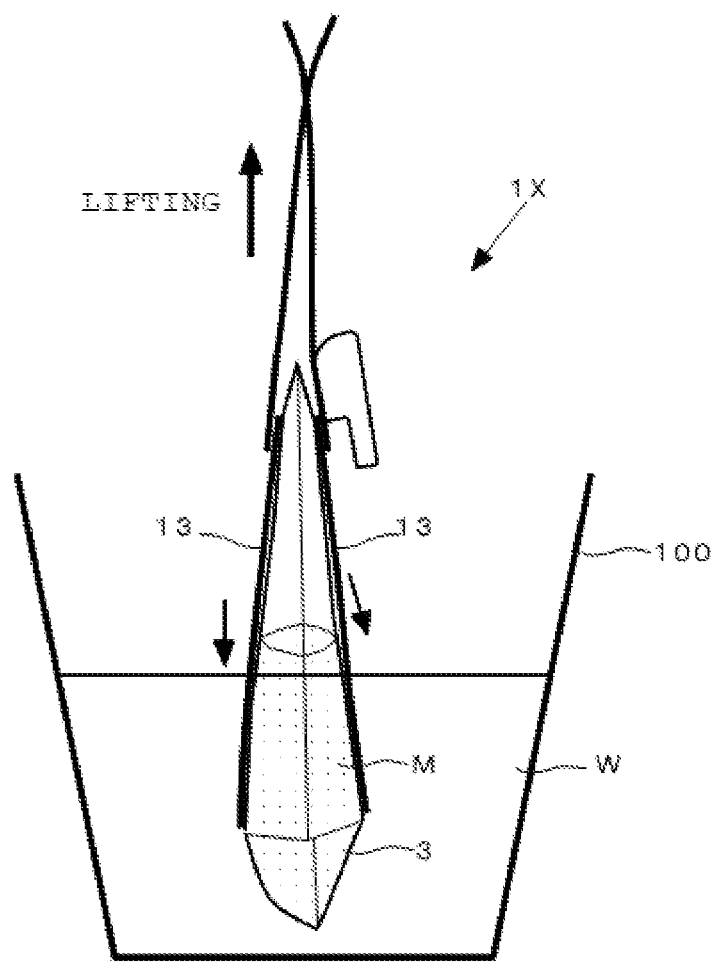
FIG. 15D is a side view illustrating a state in which the extraction bag 1X according to the comparative example is being lifted from the hot water in the cup.

In contrast to this, if an upper edge 11a of an upper edge portion 11 is away from an upper edge 3a of a bag main body 3 as in an extraction bag 1X of a comparative example shown in FIGS. 15A and 15B, pushing force when the bag main body 3 is pushed into hot water in a cup 100 is less likely to be evenly transferred to the two opposing faces of the bag main body 3. Consequently, the bag main body 3 is bent toward only one of the outer surfaces of the opposing faces of the bag main body 3 as shown in FIG. 15C, thereby reducing a head space S in the bag main body 3. Thus, a sufficient amount of hot water cannot be retained in the bag main body 3. Consequently, when the bag main body 3 is lifted as shown in FIG. 15D, hot water flows along the surface of the bag main body 3 but the hot water is less likely to permeate into the inside of the entire ground coffee filled in the bag main body 3. This makes it difficult to obtain extraction liquid with sufficient concentration within a short amount of time even if the motions of pushing and lifting the bag main body in the hot water are repeated.

After extraction liquid is obtained by using the extraction bag 1A according to the embodiment of the present invention, the gripping portions 12 can be gripped to easily discard the extraction bag. Alternatively, the extraction liquid in the cup can be drunk while the hooking portions 15 are still hooked onto the opening wall 101 of the cup 100.

Figure 5:
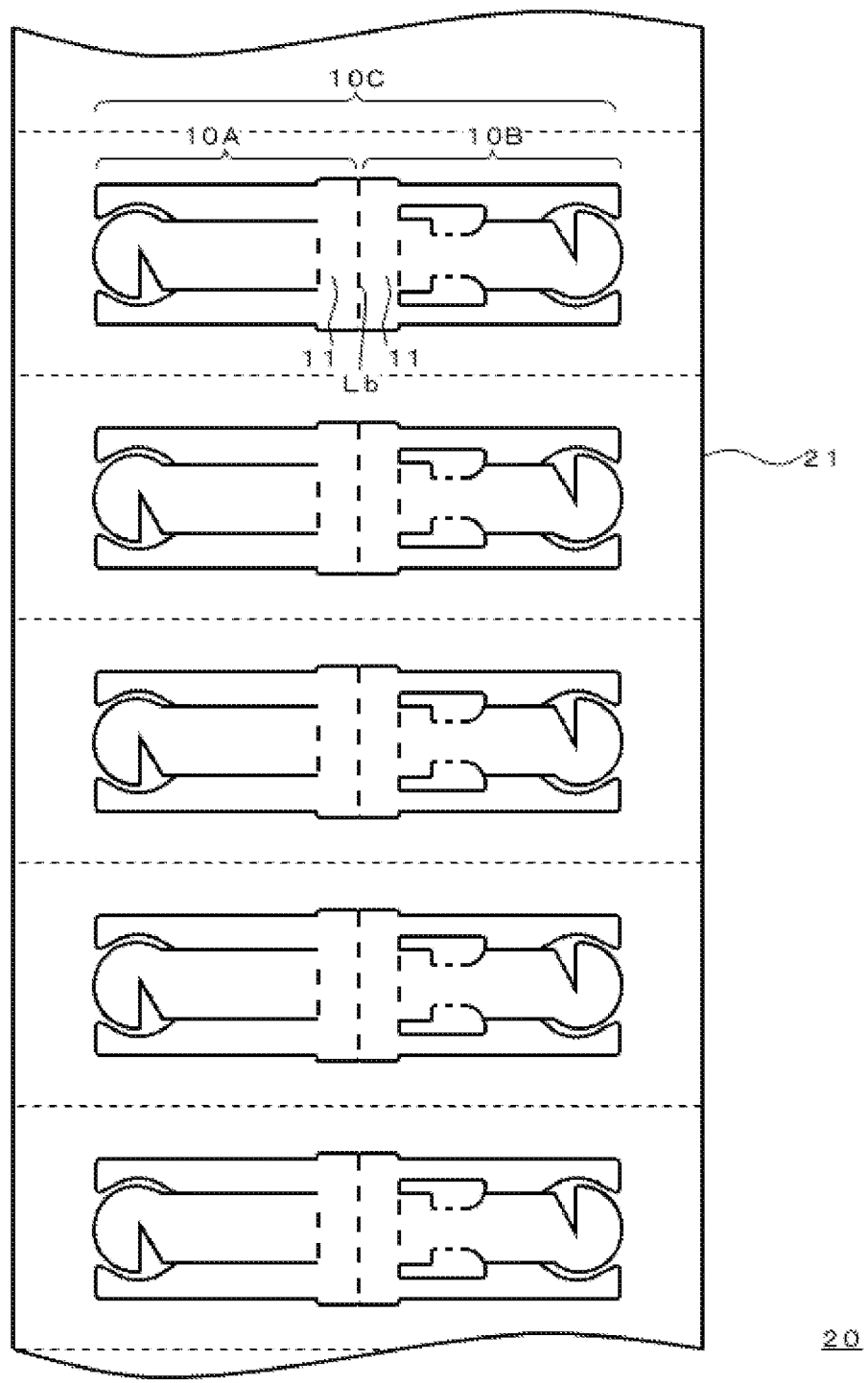
FIG. 5 is a plan view illustrating an extraction bag production sheet used for producing the extraction bags 1A according to the embodiment.

Production Method:

As a method of producing the extraction bag 1A, the extraction bag production sheet 20 having thin plate-like members 10C arranged on, and bonded to, a long water permeable filter sheet 21 at predetermined intervals is prepared as shown in FIG. 5, for example. Here, in each of the thin plate-like members 10C, the pair of thin plate-like members 10A and 10B are integrally formed via the fold line Lb. In the figure, a region sandwiched between fine broken lines is used for producing a single extraction bag.

Figure 6:
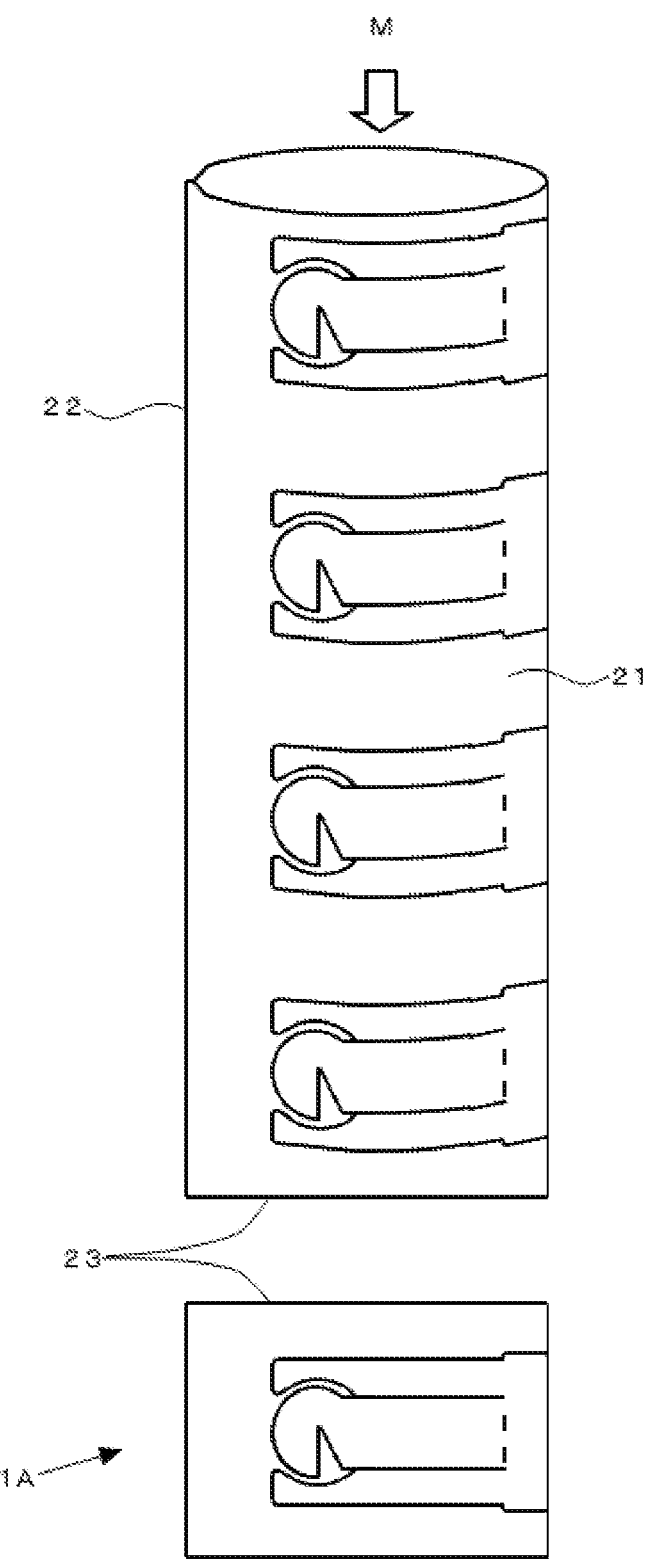
FIG. 6 is an explanatory diagram for a method of producing the extraction bags 1A according to the embodiment.

The extraction bags 1A can be continuously produced by using this extraction bag production sheet 20 in a filling and packaging machine. In this case, the extraction bag production sheet 20 is first folded in half in such a manner that lateral edges of the extraction bag production sheet 20 in the long-side direction thereof are overlapped with each other as shown in FIG. 6. The lateral edges in the long-side direction are then bonded by means of melting to form a vertical seal 22. In this manner, a tubular body is formed. Subsequently, an operation of forming a horizontal seal 23 that bonds the tubular body by means of melting in the short-side direction and an operation of filling the extraction material M into the bag main body 3 are alternately repeated to produce an extraction bag continuous body in which the extraction bags 1A are connected in the up-and-down direction along the lateral edges of the bag main bodies 3 of the extraction bags 1A. Such an extraction bag continuous body is separated into individual extraction bags to obtain the extraction bags 1A. Alternatively, at the same time with the formation of the horizontal seal 23 in the short-side direction of the tubular body, cutting by means of melting is performed to produce an individually separated extraction bag 1A continuously.

Modified Aspects:

Various changes can be made to the extraction bag of the present invention. For example, upper edges 11a of upper edge portions 11 in a pair of thin plate-like members 10A and 10B may be separated from each other as in an extraction bag 1B having a developed view shown in FIG. 7A and a front view of FIG. 7B. In this case, the upper edge portions 11 are bonded to an underlying water permeable filter sheet 2 in the vicinity of the upper edges 11a of the upper edge portions 11 as shown in FIG. 7B. Thus, the state of the upper edges 11a of the upper edge portions 11 in contact with each other is maintained also when gripping portions 12 are folded upward and a bag main body 3 is pushed into hot water.

In this extraction bag 1B, hooking portions 15 are omitted. The hooking portions 15 are provided as necessary in the present invention depending on, for example, the kinds of the extraction materials. In the extraction of green tea, for example, an amount of time during which tea leaves are steeped in hot water can be shorter than that in the extraction of coffee, and the bag main body may be immersed into hot water previously poured into a cup. Thus, the hooking portions 15 can be omitted.

Figure 7A:
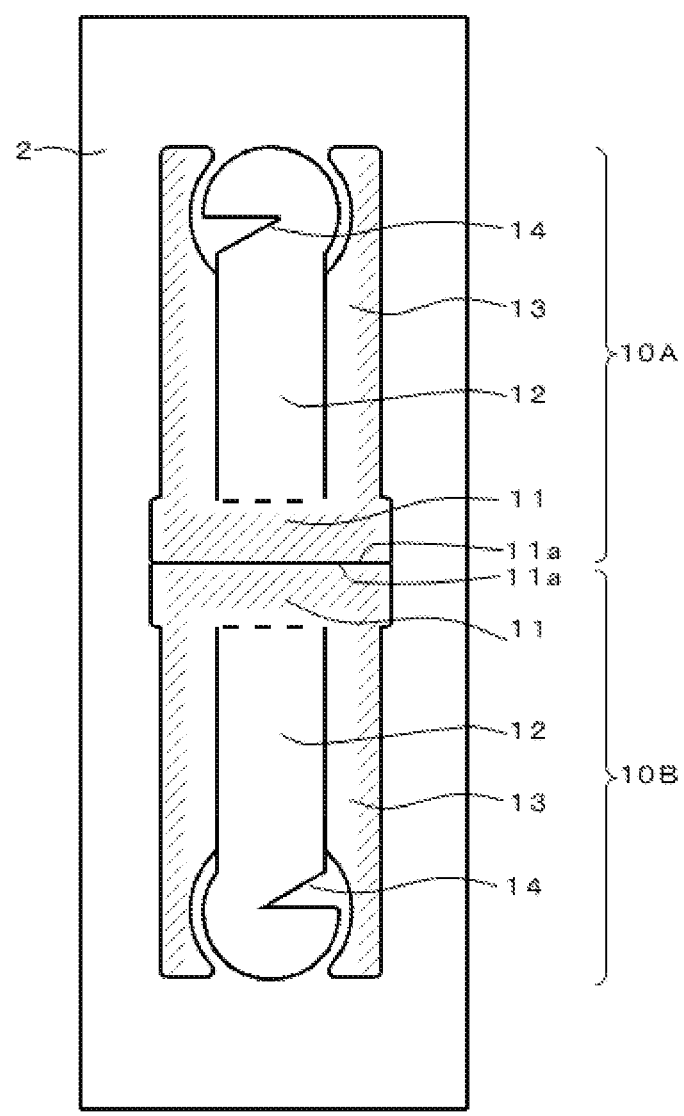
FIG. 7A is a developed view illustrating a bag main body including thin plate-like members in an extraction bag 1B according to an embodiment.
Figure 7B:
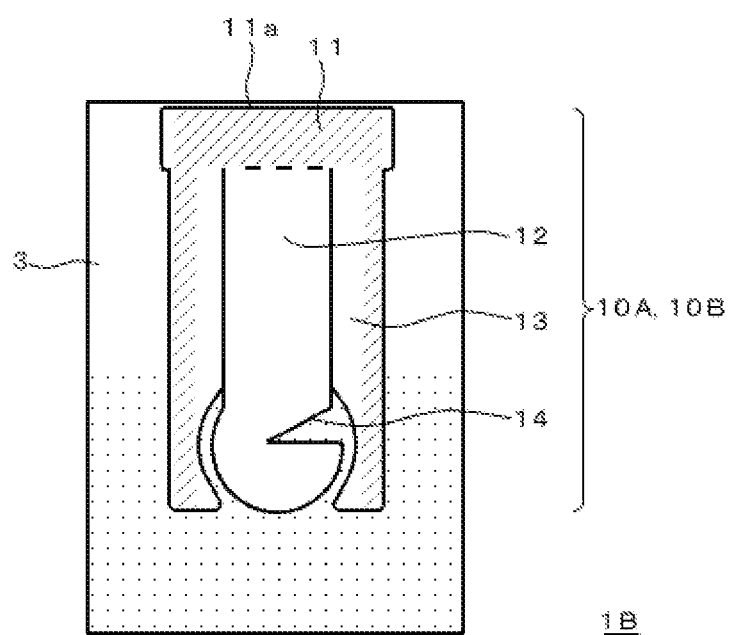
FIG. 7B is a front view illustrating the extraction bag 1B according to the embodiment in a state in which gripping portions are not folded upward.
Figure 8A:
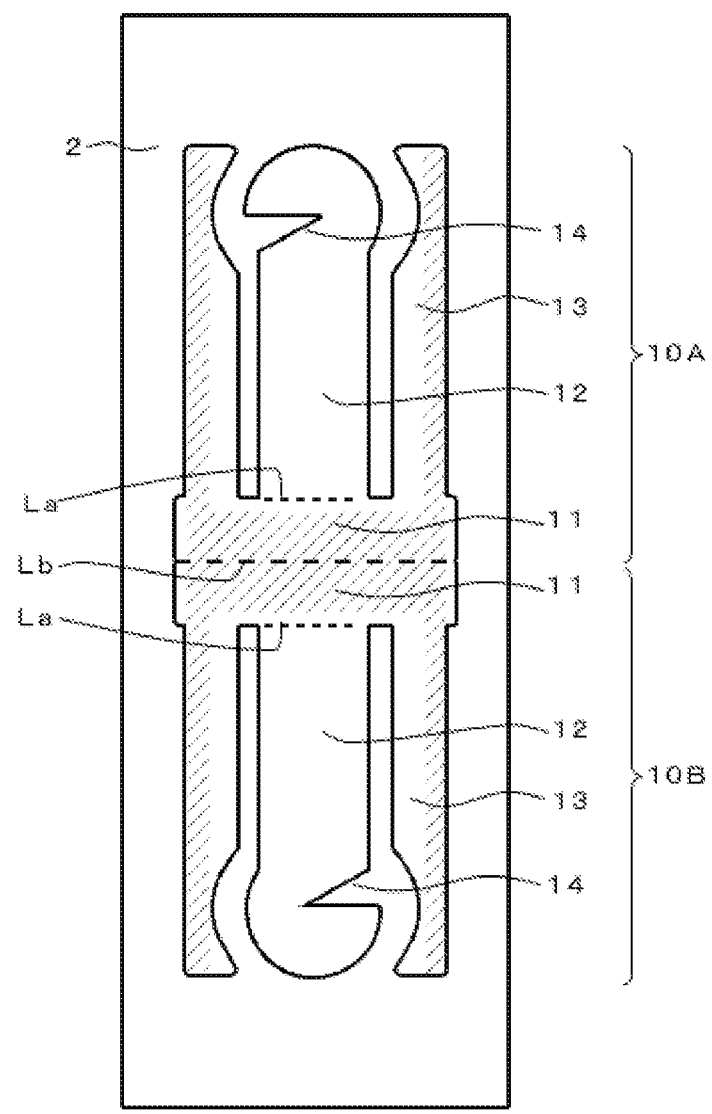
FIG. 8A is a developed view illustrating a bag main body including thin plate-like members in an extraction bag 1C according to an embodiment.
Figure 8B:
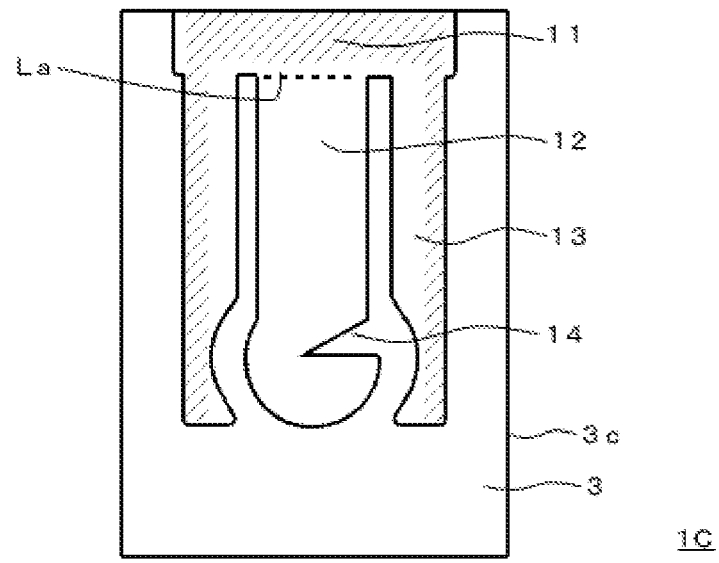
FIG. 8B is a front view illustrating the extraction bag 1C according to the embodiment in a state in which gripping portions are not folded upward.

In comparison to the extraction bag 1B shown in FIGS. 7A and 7B, an extraction bag 1C having a developed view shown in FIG. 8A and a front view of FIG. 8B is configured in such a manner that: upper edge portions 11 in a pair of thin plate-like members 10A and 10B are made continuous with each other via a fold line Lb; leg portions 13 on both sides of a gripping portion 12 are spaced apart from the gripping portion 12; and the leg portions 13 are made closer to lateral edges 3c of a bag main body 3. If the leg portions 13 are made excessively closer to the lateral edges 3c of the bag main body 3, a head space formed in the bag main body 3 is reduced, thus making hot water less likely to permeate into the extraction material when the bag main body 3 is immersed into the hot water. The leg portions 13, however, can be made closer to the lateral edges 3c of the bag main body 3 unless such closeness exerts adverse effects on an amount of time needed for hot water to permeate into the extraction material.

Figure 9A:
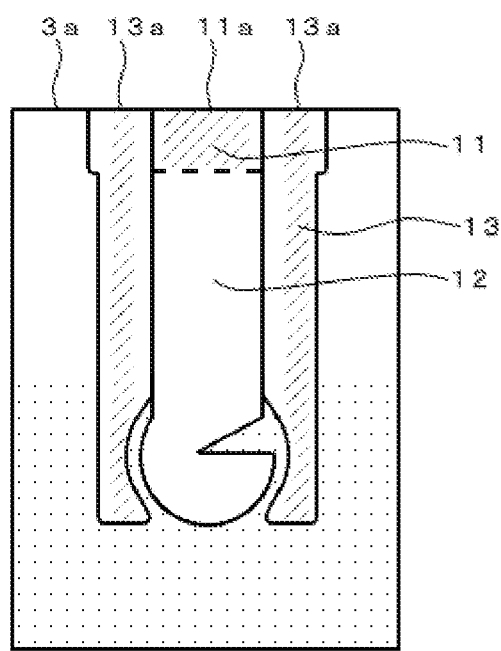
FIG. 9A is a front view illustrating an extraction bag 1D according to an embodiment in a state in which gripping portions are not folded upward.
Figure 9B:
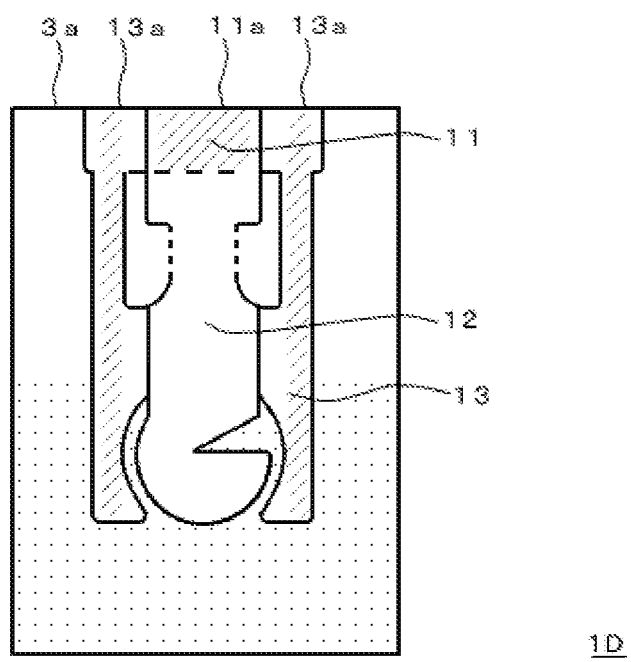
FIG. 9B is a rear view illustrating the extraction bag 1D according to the embodiment in a state in which the gripping portions are not folded upward.

In comparison to the extraction bag 1A shown in FIGS. 1A to 1D, an extraction bag 1D shown in FIGS. 9A and 9B is configured in such a manner that an upper edge portion 11 is separated from leg portions 13. As just described, the upper edge portion 11 and the leg portions 13 in the present invention may not be formed in a continuous manner as long as their upper edges 11a and 13a are flush with an upper edge 3a of a bag main body 3. From the standpoint of reliably preventing the bag main body from being curved or bent toward only one of the outer surfaces the opposing faces thereof when the bag main body 3 is pushed into hot water while gripping the gripping portions 12, it is preferable that the upper edge portion 11 be formed continuously with the leg portions 13.

Figure 10A:
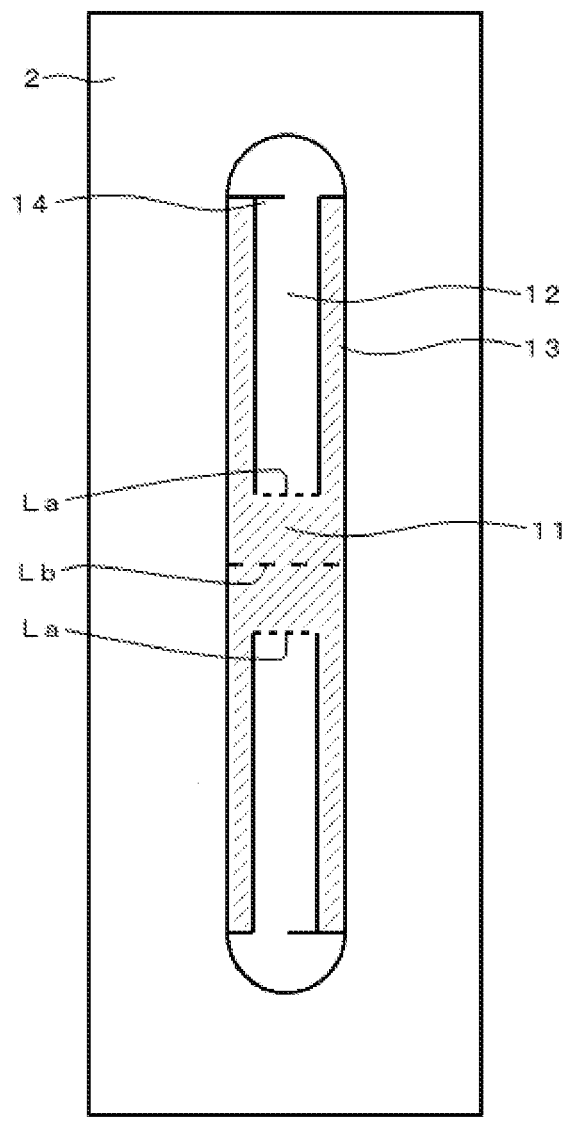
FIG. 10A is a developed view illustrating a bag main body including thin plate-like members in an extraction bag 1E according to an embodiment.
Figure 10B:
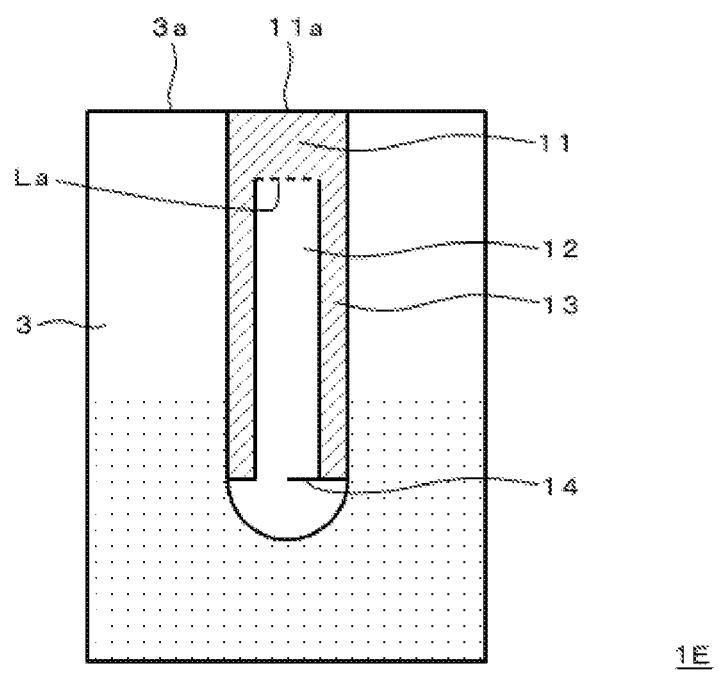
FIG. 10B is a front view illustrating the extraction bag 1E according to the embodiment in a state in which gripping portions are not folded upward.
Figure 10C:
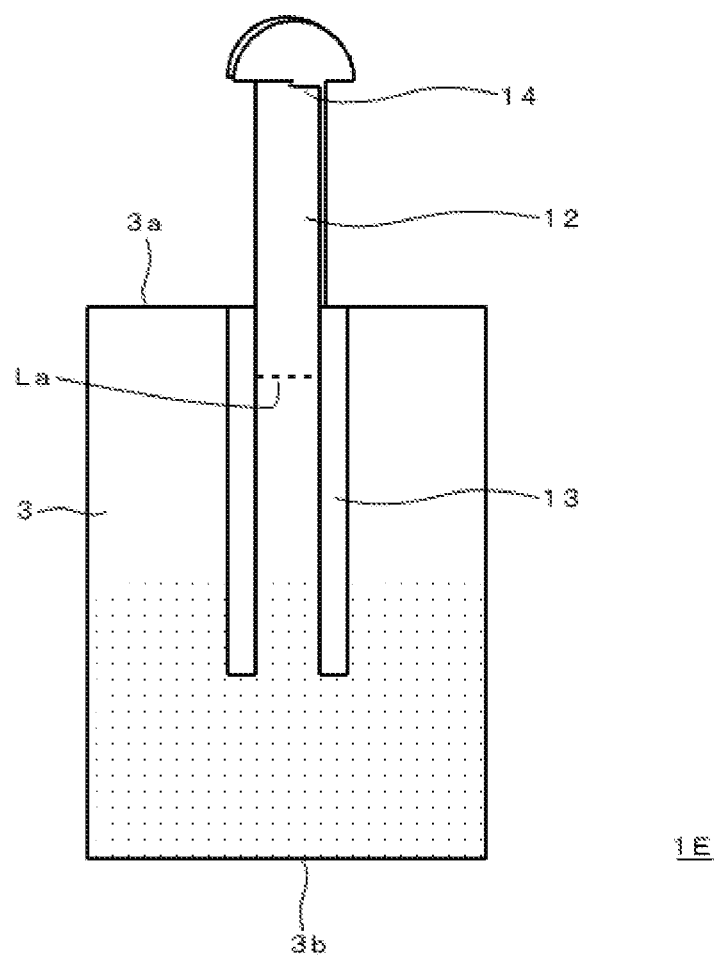
FIG. 10C is a front view illustrating the extraction bag 1E according to the embodiment in a state in which the pair of gripping portions are folded upward and engaged with each other.

In comparison to the extraction bag 1A shown in FIGS. 1A to 1D, an extraction bag 1E having a developed view shown in FIG. 10A and a front view of FIG. 10B and including gripping portions 12 to be folded upward as shown in FIG. 10C is configured in such a manner that: an engagement portion 14 at an end part of the gripping portion 12 is formed as an I notch; the positions of lower ends of leg portions 13 extending from an upper edge 3a of a bag main body 3 toward a lower edge side are located closer to the upper edge 3a of the bag main body than the position of the lower end of the gripping portion 12; and hooking portions 15 are omitted. Even when the extraction bag is made to have a shape simpler than that of the extraction bag 1A as just described in order to produce extraction bags at low cost, upper edges 11a of upper edge portions 11 on both outer surfaces of the bag main body 3 are flush with the upper edge 3a of the bag main body 3 and the leg portions 13 extend from the upper edge 3a toward the lower edge side. Thus, extraction liquid can be obtained by repeating the motions of pushing and lifting the bag main body 3 in hot water so as to make the hot water permeated into the entire extraction material in the bag main body 3 within a short amount of time.

Figure 11A:
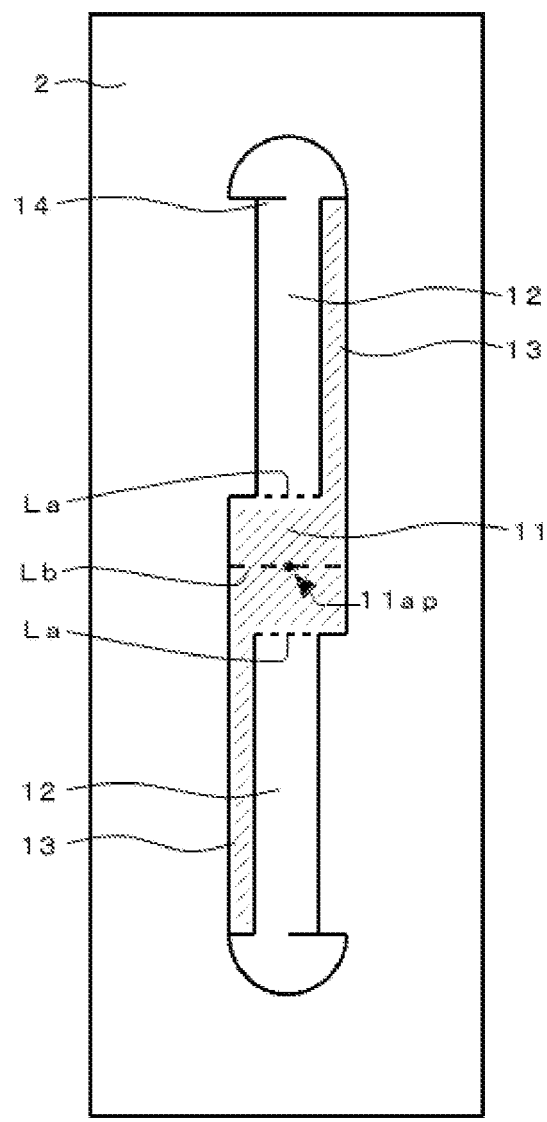
FIG. 11A is a developed view illustrating a bag main body including thin plate-like members in an extraction bag 1F according to an embodiment.
Figure 11B:
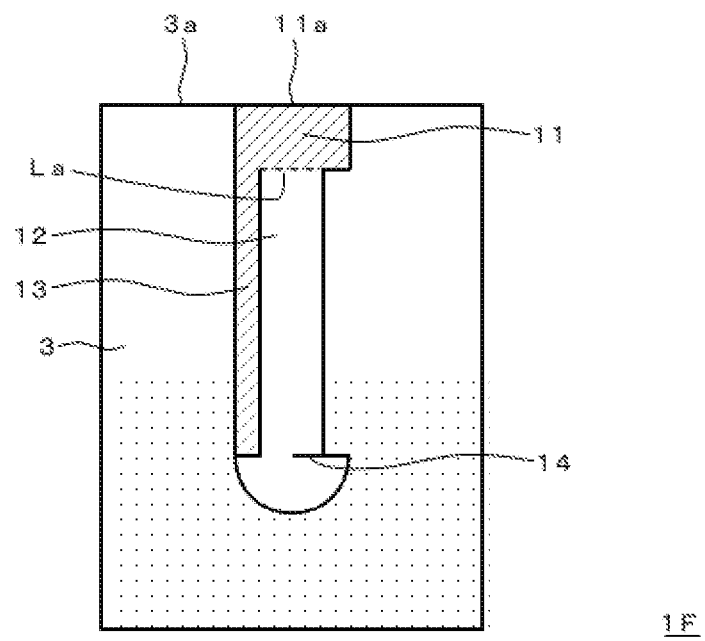
FIG. 11B is a front view illustrating the extraction bag 1F according to the embodiment in a state in which gripping portions are not folded upward.
Figure 11C:
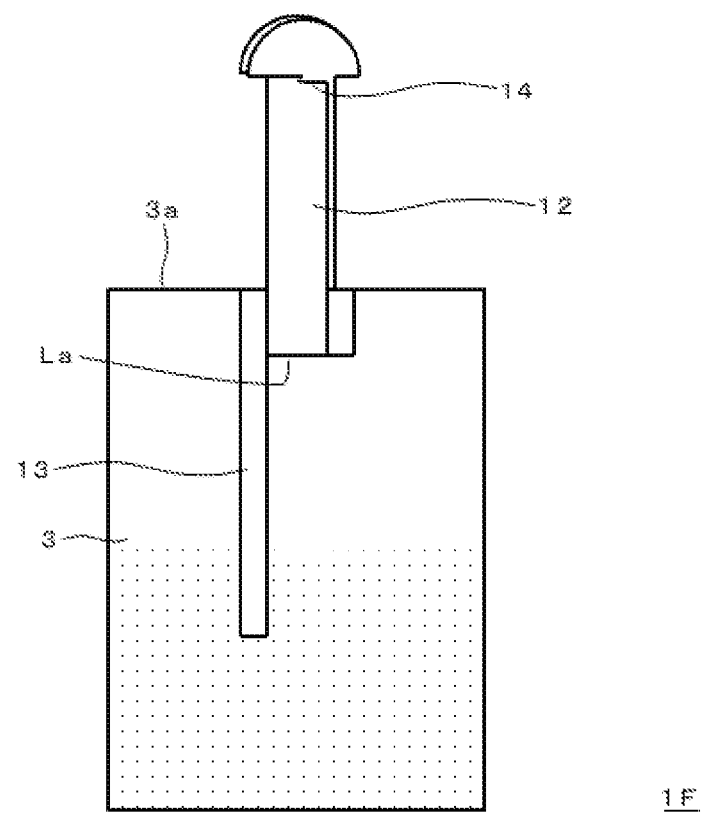
FIG. 11C is a front view illustrating the extraction bag 1F according to the embodiment in a state in which the gripping portions are folded upward and engaged with each other.

In the above-described extraction bag 1E, the leg portions 13 are provided on the right and left sides of the gripping portion 12. In contrast to the above-described extraction bag 1E, an extraction bag 1F having a developed view shown in FIG. 11A and a front view of FIG. 11B and including gripping portions 12 to be folded upward as shown in FIG. 11C is configured to include a leg portion 13 only on one side of the gripping portion 12. Note however that the leg portion 13 on one outer surface of a bag main body 3 and the leg portion 13 on the other outer surface of the bag main body 3 are formed symmetrically about a center 11ap of upper edges 11a of upper edge portions 11 in order to stably obtain a head space having an expanded shape without making the bag main body 3 curved or bent toward only one of the outer surfaces of the opposing faces thereof when the bag main body 3 is pushed into hot water while gripping the gripping portions 12.

Figure 12A:
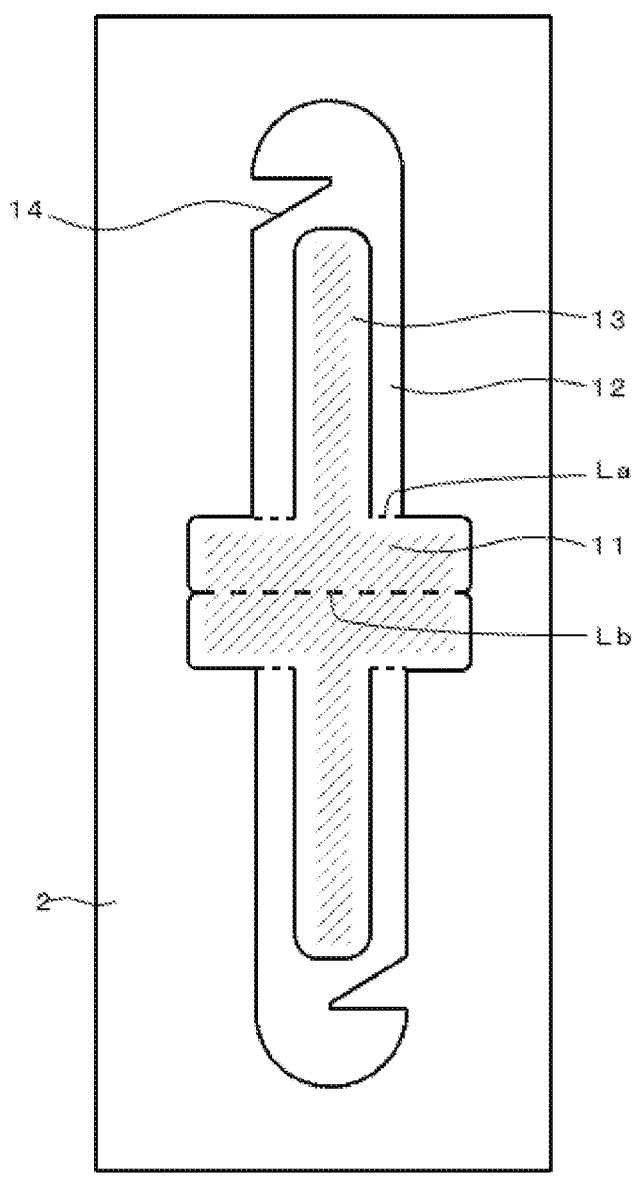
FIG. 12A is a developed view illustrating a bag main body including thin plate-like members in an extraction bag 1G according to an embodiment.
Figure 12B:
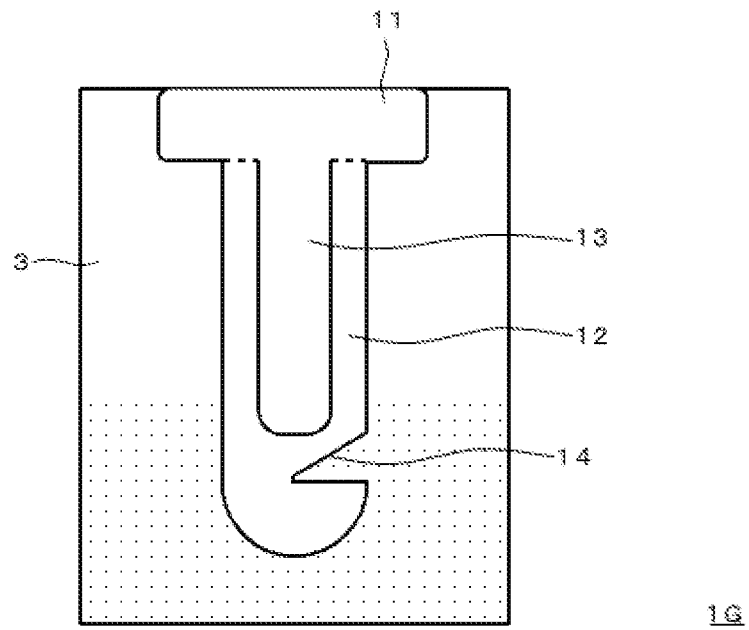
FIG. 12B is a front view illustrating the extraction bag 1G according to the embodiment in a state in which gripping portions are not folded upward.
Figure 12C:
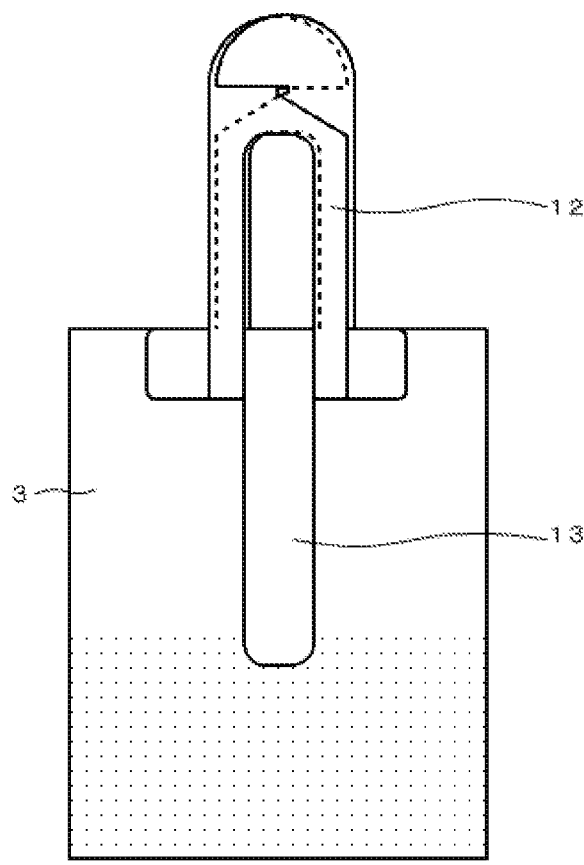
FIG. 12C is a front view illustrating the extraction bag 1G according to the embodiment in a state in which the pair of gripping portions are folded upward and engaged with each other.

As in an extraction bag 1G having a developed view shown in FIG. 12A and a front view of FIG. 12B and including gripping portions 12 to be folded upward as shown in FIG. 12C, leg portions 13 may be provided inside of the gripping portions 12.

Figure 13A:
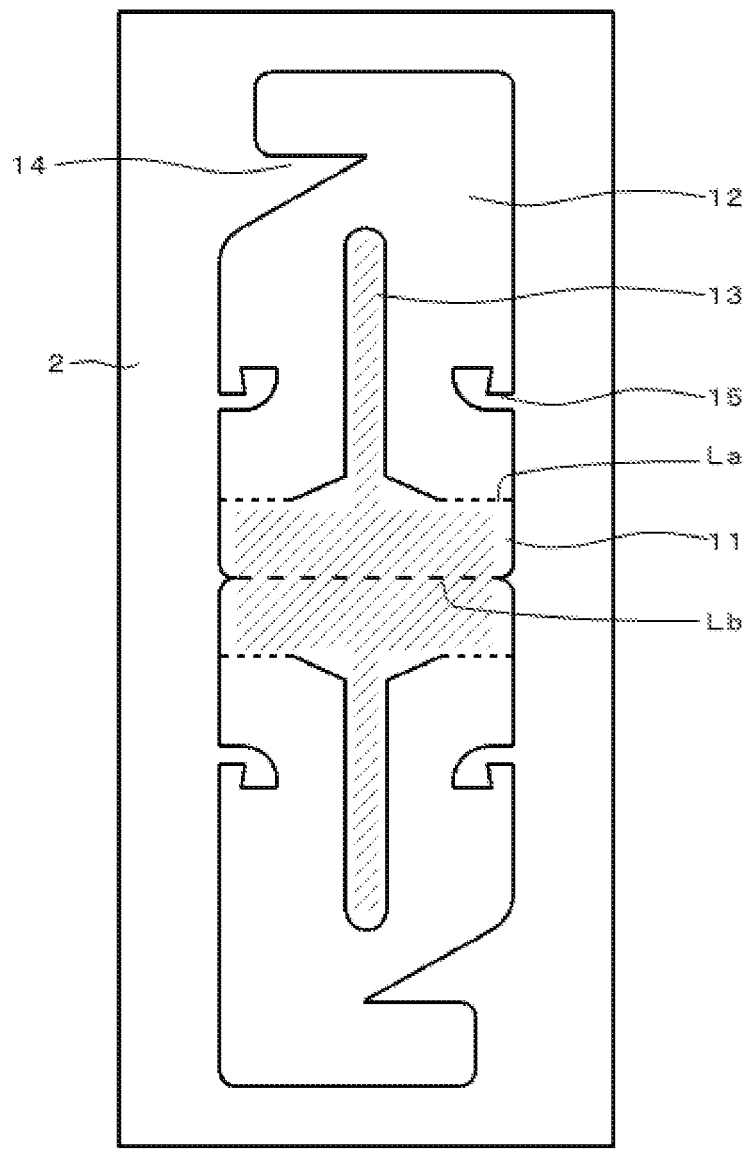
FIG. 13A is a developed view illustrating a bag main body including thin plate-like members in an extraction bag 1H according to an embodiment.
Figure 13B:
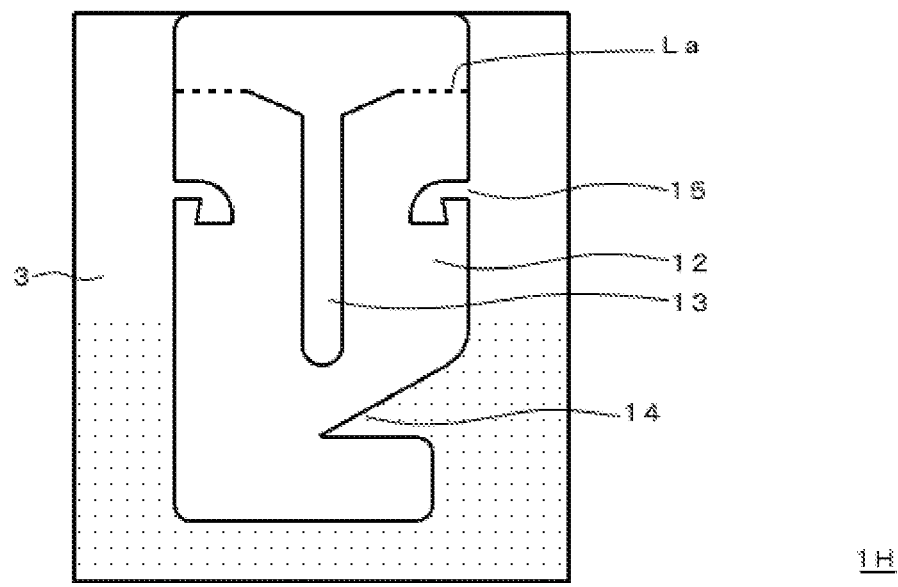
FIG. 13B is a front view illustrating the extraction bag 1H according to the embodiment in a state in which gripping portions are not folded upward.
Figure 13C:
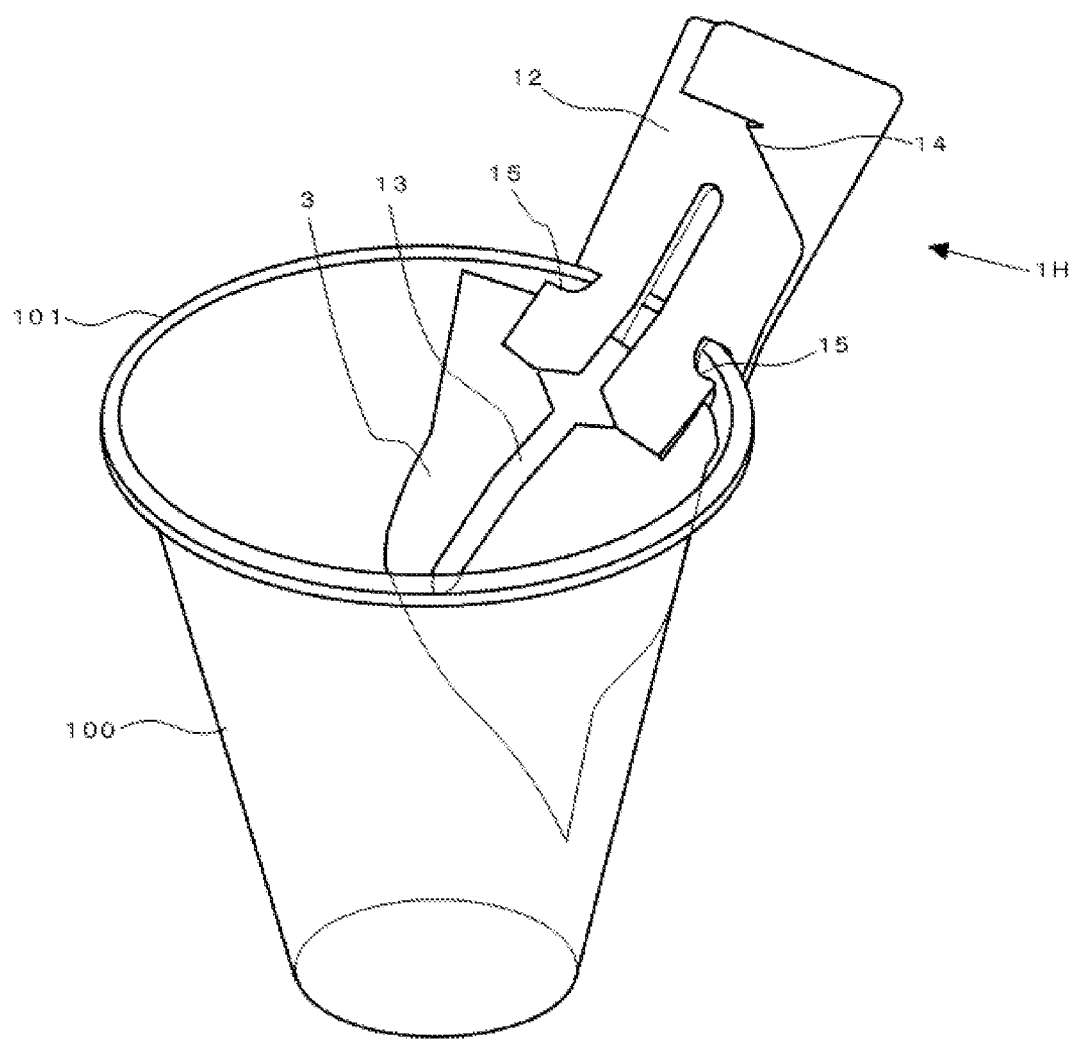
FIG. 13C is a perspective view illustrating a state in which the extraction bag 1H according to the embodiment is hooked onto a cup.

In comparison to the above-described extraction bag 1G, an extraction bag 1H, having a developed view shown in FIG. 13A and a front view of FIG. 13B, to be hooked onto a cup 100 as shown in FIG. 13C is configured in such a manner that: the gripping portion 12 of thereof has a larger width; and hooking portions 15 formed as notches are provided in lateral parts of the gripping portion 12. As just described, the hooking portions 15 in the present invention are not limited to the hooking portions of the inverted L-shaped hook type to be pulled out from the gripping portion 12. The hooking portions 15 in the present invention may be those configured to make the gripping portions 12 hooked onto the opening wall 101 of the cup 100 by means of notches. The extraction bag 1H includes engagement portions 14 to be engaged with each other at end parts of the pair of gripping portions 12. The engagement portions 14, however, may be omitted since the pair of gripping portions 12 are kept in a state of being overlapped with each other when the gripping portions 12 are hooked onto the cup by the hooking portions 15.

Figure 14A:
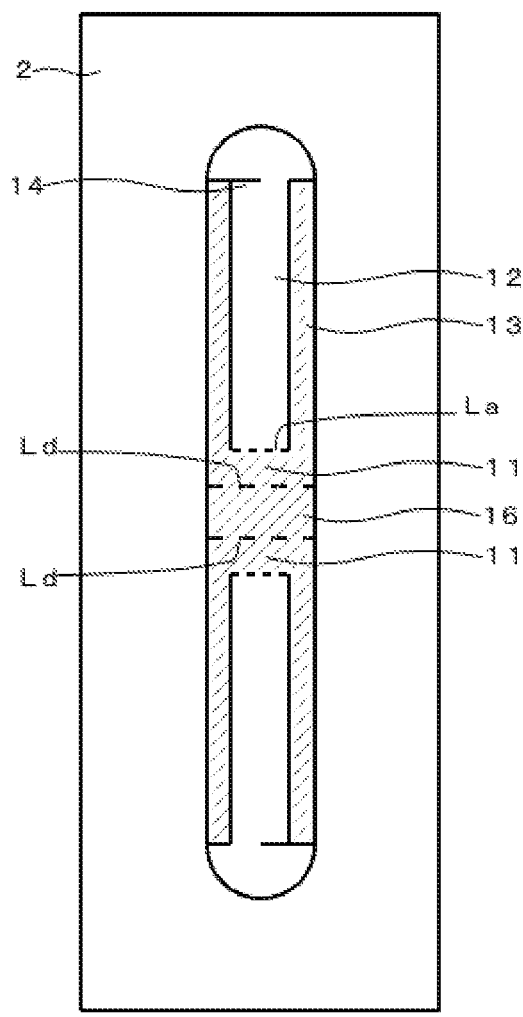
FIG. 14A is a developed view illustrating a bag main body including thin plate-like members in an extraction bag 1I according to an embodiment.
Figure 14B:
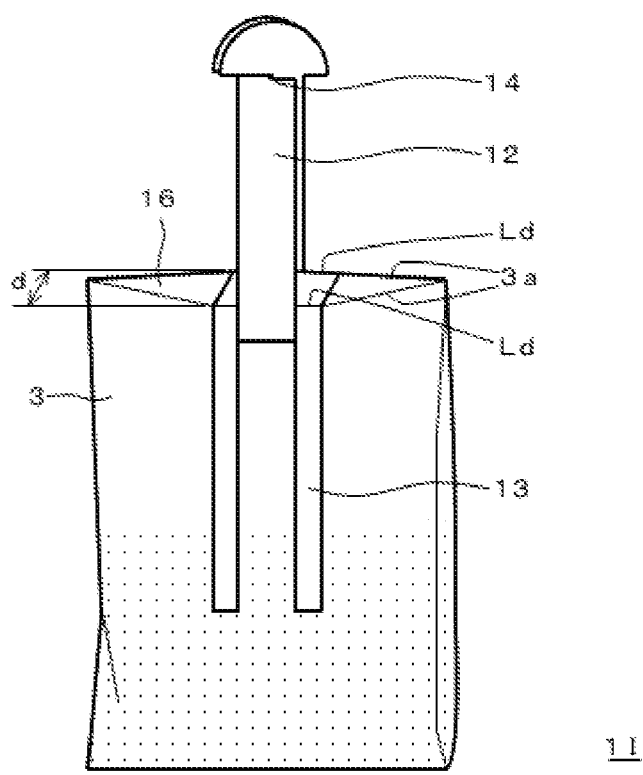
FIG. 14B is a perspective view illustrating the extraction bag 1I according to the embodiment in a state in which a pair of gripping portions are folded upward and engaged with each other.

In an extraction bag 1I having a developed view shown in FIG. 14A and including a pair of gripping portions 12 to be folded upward and engaged with each other as shown in FIG. 14B, an intermediate portion 16 is provided between upper edge portions 11 provided on the outer surfaces of two opposing faces of a bag main body 3, and the upper edge portions 11 are continuous with the intermediate portion 16 via fold lines Ld. Consequently, a thickness d is formed at an upper end part of the bag main body 3 by the two fold lines Ld in the extraction bag 1I, and the positions of the fold lines Ld coincide with an upper edge 3a of the bag main body 3. By the formation of the upper end part of the bag main body 3 having the thickness d as just described, a head space can be formed in the bag main body 3 in a more stable manner. From the standpoint of putting the extraction bag 1I in an outer package, it is preferable that the dimension of the thickness d be smaller than or about equal to the thickness of the bottom of the bag expanded by the extraction material.

Although the various aspects of the present invention have been described above, the changes in the various aspects of the present invention can be combined as appropriate.

REFERENCE SIGNS LIST 1A, 1B, 1C, 1D, 1E, 1F, 1G, 1H, 1I, 1X extraction bag
2 water permeable filter sheet
3 bag main body
3a upper edge of bag main body
3b lower edge of bag main body
3c lateral edge of bag main body
10A, 10B, 10C thin plate-like member
11 upper edge portion
11a upper edge of upper edge portion
11ap center of upper edge of upper edge portion
12 gripping portion
12a lateral edge of gripping portion
13 leg portion
14 engagement portion
15 hooking portion
16 intermediate portion
20 extraction bag production sheet
21 long water permeable filter sheet
22 vertical seal
23 horizontal seal
100 cup
101 opening wall of cup
102 bottom of cup
d thickness
La, Lb, Lc, Ld fold line
M extraction material
P upper surface of extraction material
S head space
W hot water

The invention claimed is:

1. An extraction bag comprising:
a bag main body formed of a water permeable filter sheet;
a pair of thin plate-like members provided on outer surfaces of two opposing faces of the bag main body; and
an extraction material filled in the bag main body, wherein
on each of the outer surfaces, the thin plate-like member includes
an upper edge portion attached to an upper part of the bag main body,
a gripping portion continuous with the upper edge portion via a fold line and extending from the fold line toward a lower edge of the bag main body, and
a leg portion extending from an upper edge of the bag main body toward the lower edge of the bag main body,
an upper edge of the upper edge portion is flush with the upper edge of the bag main body, and
the gripping portion is able to be folded upward along the fold line so that a leading end part of the gripping portion projects from the upper edge of the bag main body.

2. The extraction bag according to claim 1, wherein the upper edges of the upper edge portions provided in the respective outer surfaces are continuous with each other via a fold line.

3. The extraction bag according to claim 1, comprising engagement portions to make the gripping portion on each of the outer surfaces that are folded upward engaged with each other.

4. The extraction bag according to claim 1, wherein, when the bag main body is hung with the upper edge of the bag main body facing upward, lower ends of the leg portions are positioned closer to the lower edge of the bag main body than an upper surface of the extraction material.

5. The extraction bag according to claim 1, wherein the leg portions are provided on both sides of the gripping portion on each of the outer surfaces.

6. The extraction bag according to claim 1, wherein the gripping portion includes a hooking portion by which the gripping portion, in a state of being folded upward, can be hooked onto an opening wall of a cup.

* * * * *